(12) United States Patent
Barnes

(10) Patent No.: US 11,220,046 B2
(45) Date of Patent: Jan. 11, 2022

(54) ADDITIVE MANUFACTURING

(71) Applicant: HEWLETT-PACKARD DEVELOPMENT COMPANY, L.P., Spring, TX (US)

(72) Inventor: Arthur H. Barnes, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 694 days.

(21) Appl. No.: 16/075,184

(22) PCT Filed: Apr. 9, 2017

(86) PCT No.: PCT/US2017/026733
§ 371 (c)(1),
(2) Date: Aug. 3, 2018

(87) PCT Pub. No.: WO2018/190784
PCT Pub. Date: Oct. 18, 2018

(65) Prior Publication Data
US 2021/0197451 A1     Jul. 1, 2021

(51) Int. Cl.
*B29C 64/165*     (2017.01)
*B33Y 10/00*     (2015.01)
(Continued)

(52) U.S. Cl.
CPC .......... *B29C 64/165* (2017.08); *B29C 64/218* (2017.08); *B29C 64/236* (2017.08);
(Continued)

(58) Field of Classification Search
CPC ... B29C 64/165; B29C 64/218; B29C 64/264; B29C 64/314; B29C 71/02;
(Continued)

(56) References Cited

U.S. PATENT DOCUMENTS 8,718,522 B2    5/2014    Chillscyzn et al.
9,352,421 B2    5/2016    Illston
(Continued)

FOREIGN PATENT DOCUMENTS

EP     0734842 B2    5/2006
EP     3137283 A1    3/2017
(Continued)

OTHER PUBLICATIONS

"3 Most Common 3D Printer Errors and Their Fixes", Retrieved from Internet: https://pinshape.com/blog/3-most-common-3d-printer-errors-and-fixes/, Apr. 28, 2016, 8 pages.

*Primary Examiner* — Nahida Sultana
(74) *Attorney, Agent, or Firm* — Dierker & Kavanaugh PC

(57) ABSTRACT

In one example, a processor readable medium having instructions thereon that when executed cause a fusing system for an additive manufacturing machine to, during a first carriage pass, preheat build material in a layer of unfused build material; during the first carriage pass and/or during a second carriage pass, dispense a liquid fusing agent on to preheated unfused build material in the layer and then, during the second carriage pass, irradiate build material in the layer on which the fusing agent has been dispensed with a fusing light; and during a third carriage pass, irradiate the fused build material with the fusing light; and during a fourth carriage pass, irradiate the fused build material with the fusing light and then actively cool the fused build material.

15 Claims, 18 Drawing Sheets

(51) Int. Cl.
   *B33Y 30/00* (2015.01)
   *B33Y 70/00* (2020.01)
   *B29C 64/264* (2017.01)
   *B29C 64/314* (2017.01)
   *B29C 64/236* (2017.01)
   *B29C 64/218* (2017.01)
   *B33Y 40/20* (2020.01)
   *B33Y 40/10* (2020.01)
   *B29C 71/02* (2006.01)
   *B29K 77/00* (2006.01)

(52) U.S. Cl.
   CPC .......... *B29C 64/264* (2017.08); *B29C 64/314* (2017.08); *B29C 71/02* (2013.01); *B33Y 10/00* (2014.12); *B33Y 30/00* (2014.12); *B33Y 40/10* (2020.01); *B33Y 40/20* (2020.01); *B33Y 70/00* (2014.12); *B29K 2077/00* (2013.01)

(58) Field of Classification Search
   CPC ....... B29C 64/236; B33Y 10/00; B33Y 40/10; B33Y 40/20; B33Y 70/00; B33Y 30/00; B29K 2077/00
   See application file for complete search history.

(56) References Cited

U.S. PATENT DOCUMENTS

| | | |
|---|---|---|
| 2015/0041025 A1 | 2/2015 | Wescott et al. |
| 2015/0064048 A1 | 3/2015 | Bessac et al. |
| 2017/0203387 A1* | 7/2017 | Ladewig ............ B23K 15/0086 |
| 2017/0203513 A1* | 7/2017 | Chanclon ............... B33Y 40/00 |
| 2019/0054687 A1* | 2/2019 | Bechmann ............. B33Y 50/02 |
| 2020/0346407 A1* | 11/2020 | Goodwin ............. B23K 26/342 |
| 2021/0079158 A1* | 3/2021 | Gu ......................... B33Y 70/00 |

FOREIGN PATENT DOCUMENTS

| | | |
|---|---|---|
| JP | 2011240713 A | 12/2011 |
| JP | 2016101692 A | 6/2016 |
| WO | 2015108544 A1 | 7/2015 |
| WO | WO-2015167520 A1 | 11/2015 |
| WO | 2016068899 A1 | 5/2016 |
| WO | WO-2016068899 A1 | 5/2016 |
| WO | WO-2016119898 A1 | 8/2016 |

* cited by examiner

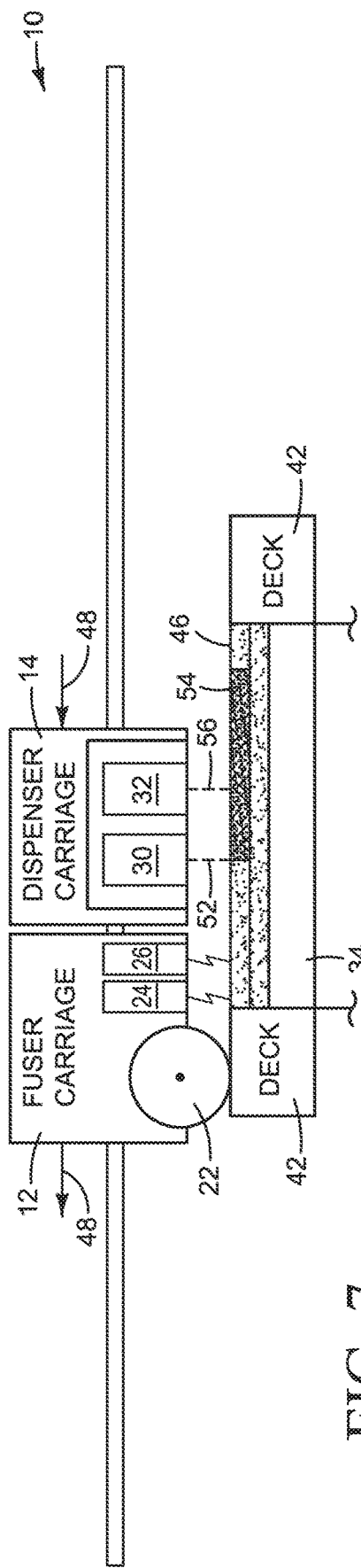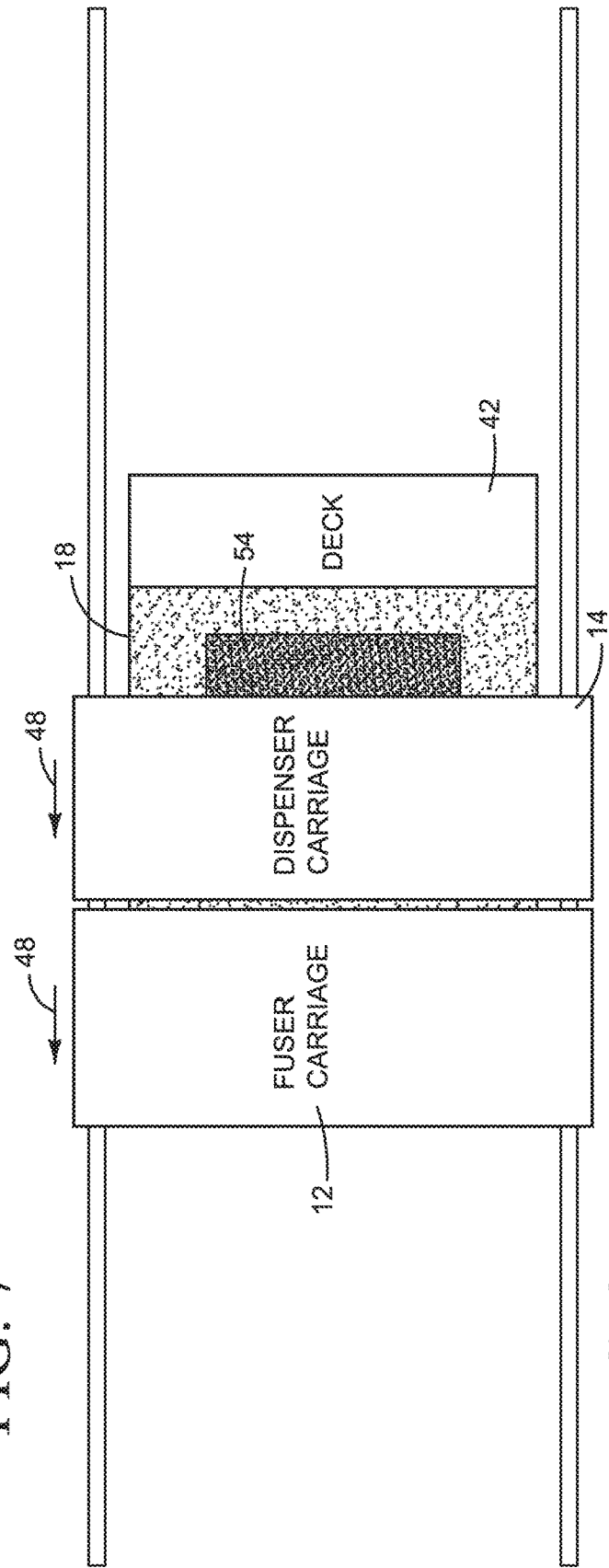

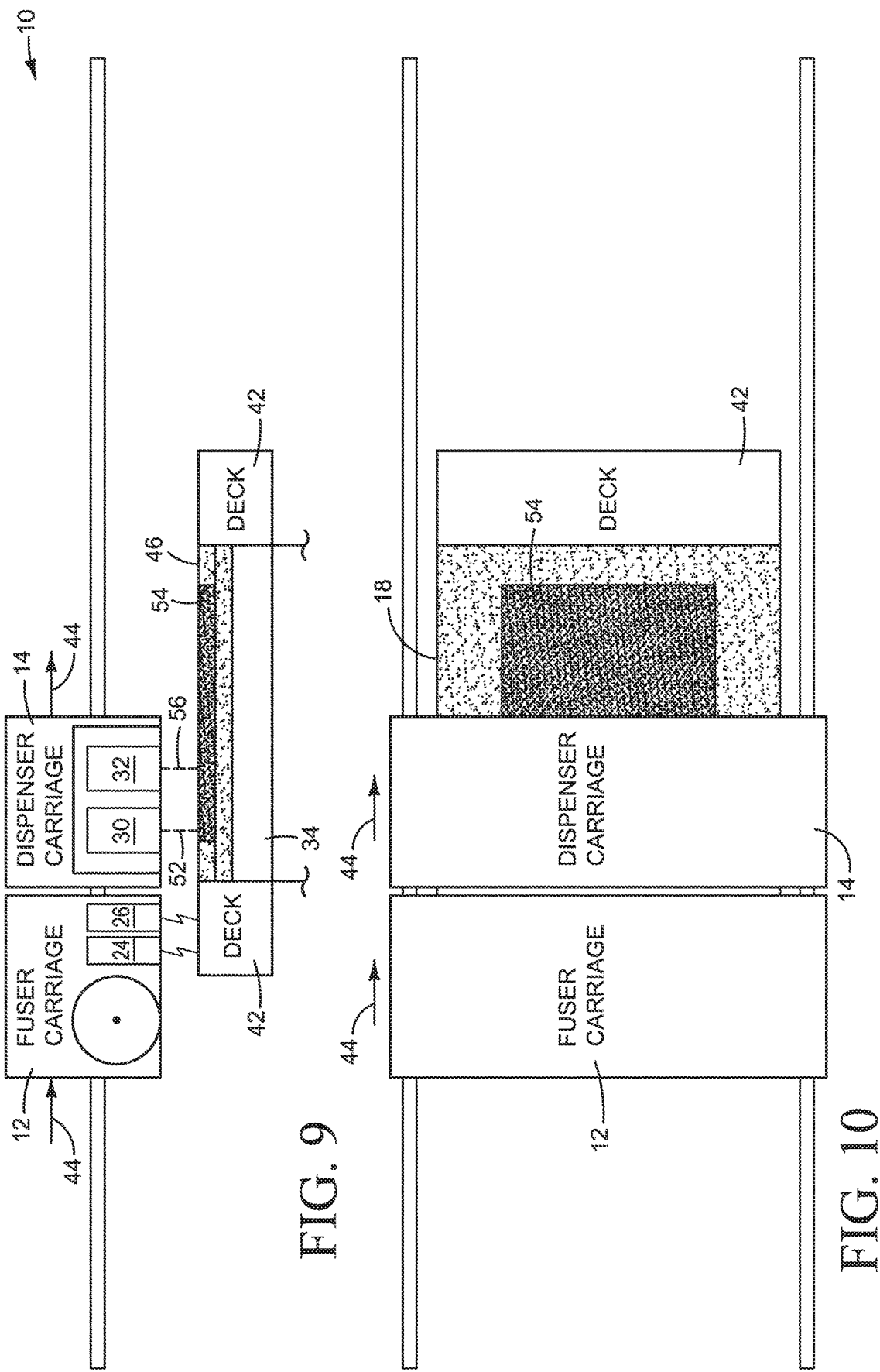

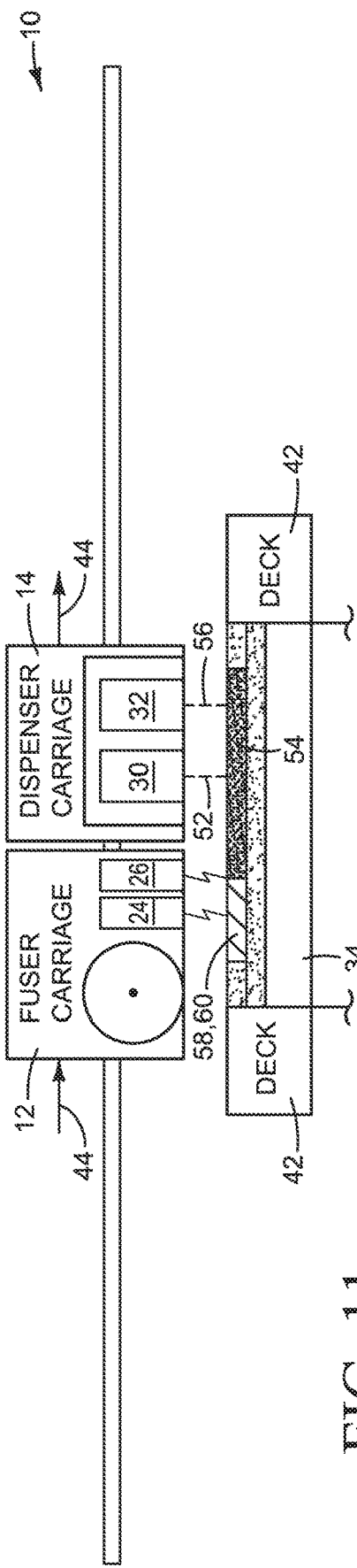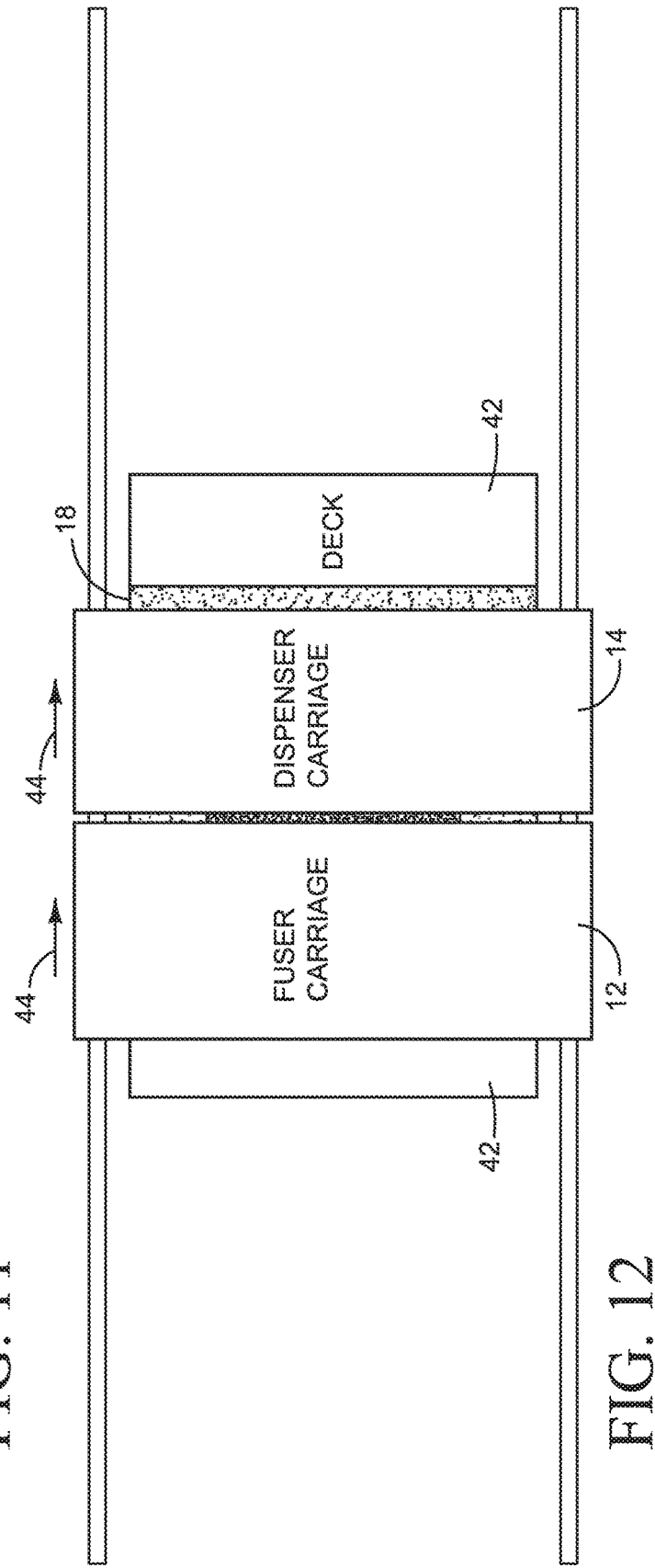

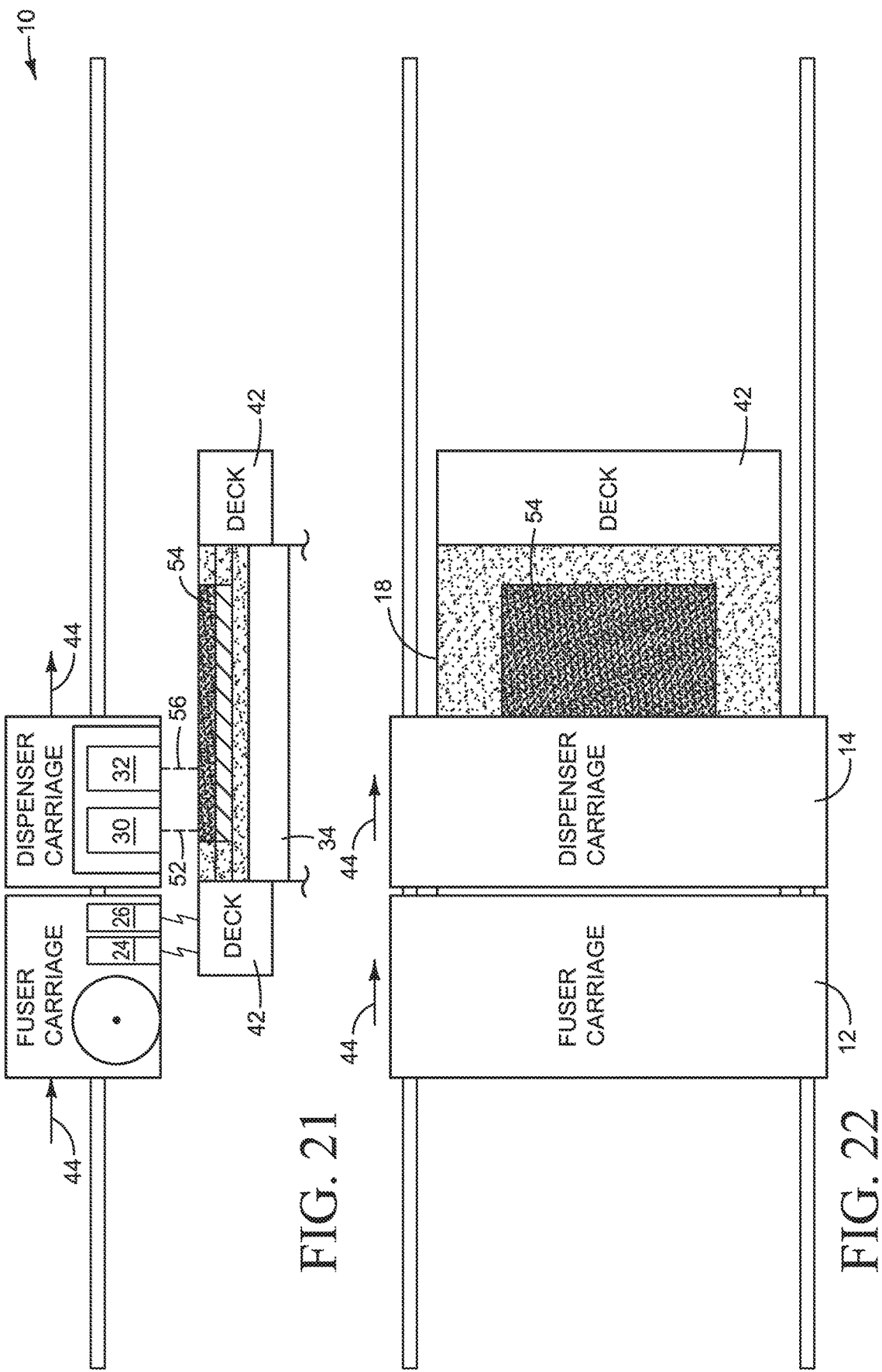

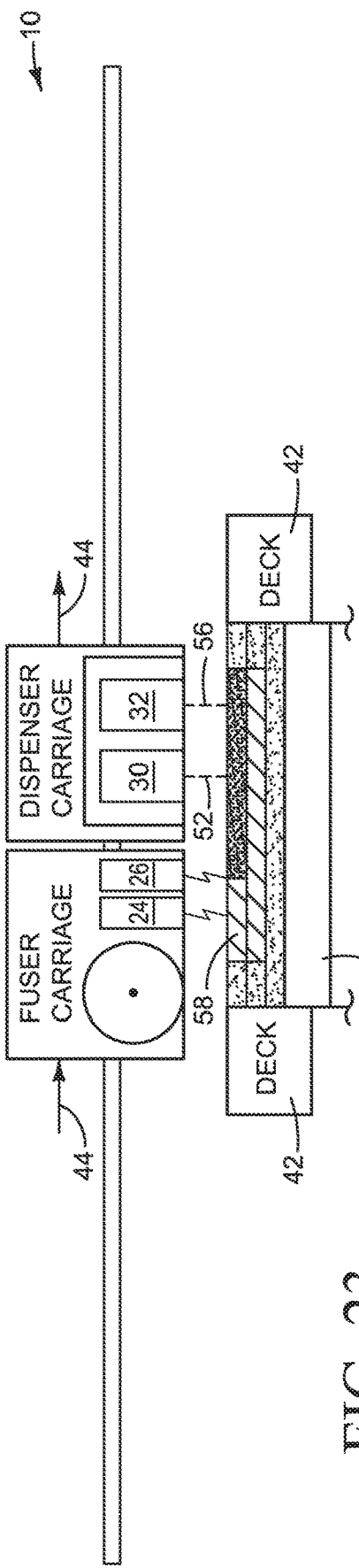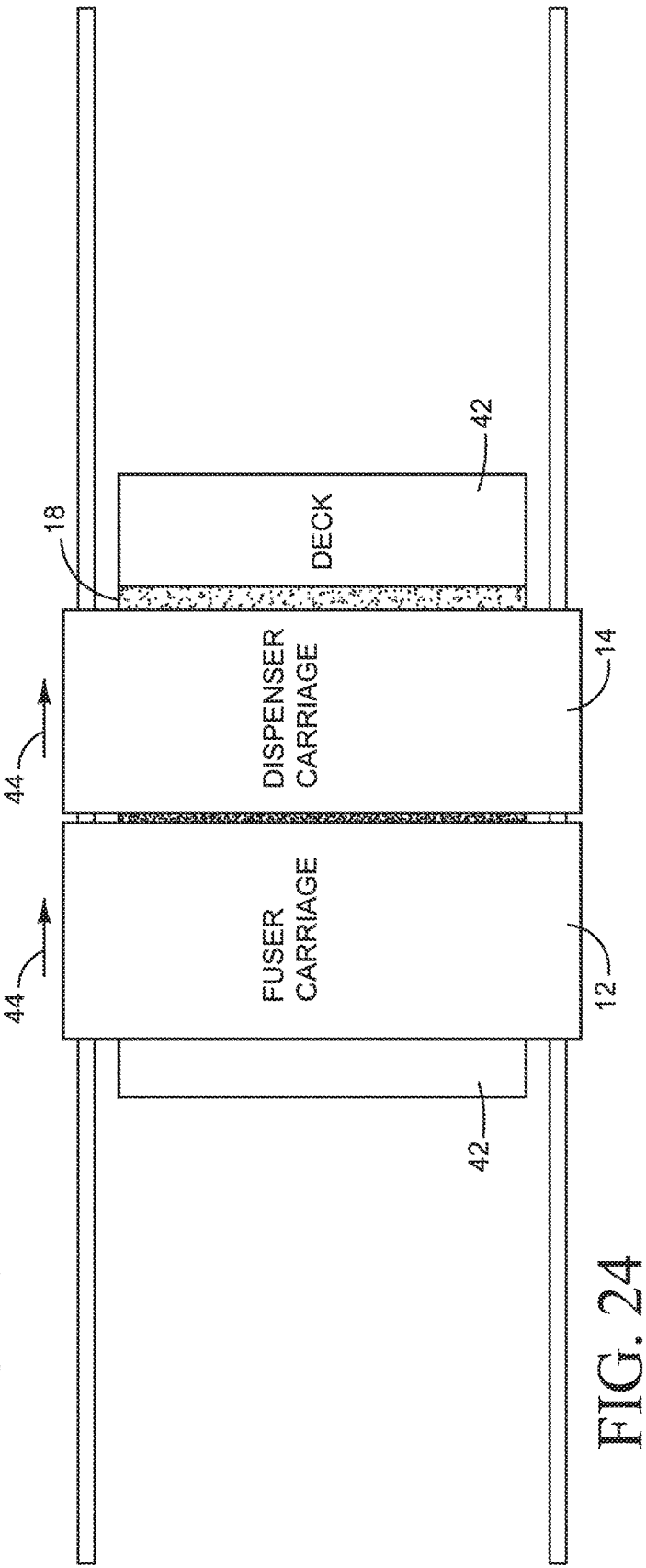

ADDITIVE MANUFACTURING

BACKGROUND

Additive manufacturing machines produce 3D objects by building up layers of material. Some additive manufacturing machines are commonly referred to as "3D printers". 3D printers and other additive manufacturing machines make it possible to convert a CAD (computer aided design) model or other digital representation of an object into the physical object. The model data may be processed into slices each defining that part of a layer or layers of build material to be formed into the object.

DRAWINGS

FIGS. 1 and 2 are elevation and plan views, respectively, illustrating one example of a fusing system for an additive manufacturing machine.

FIGS. 3-28 present a sequence of views showing one example of a four pass fusing cycle using the fusing system of FIGS. 1 and 2.

Figure 1:
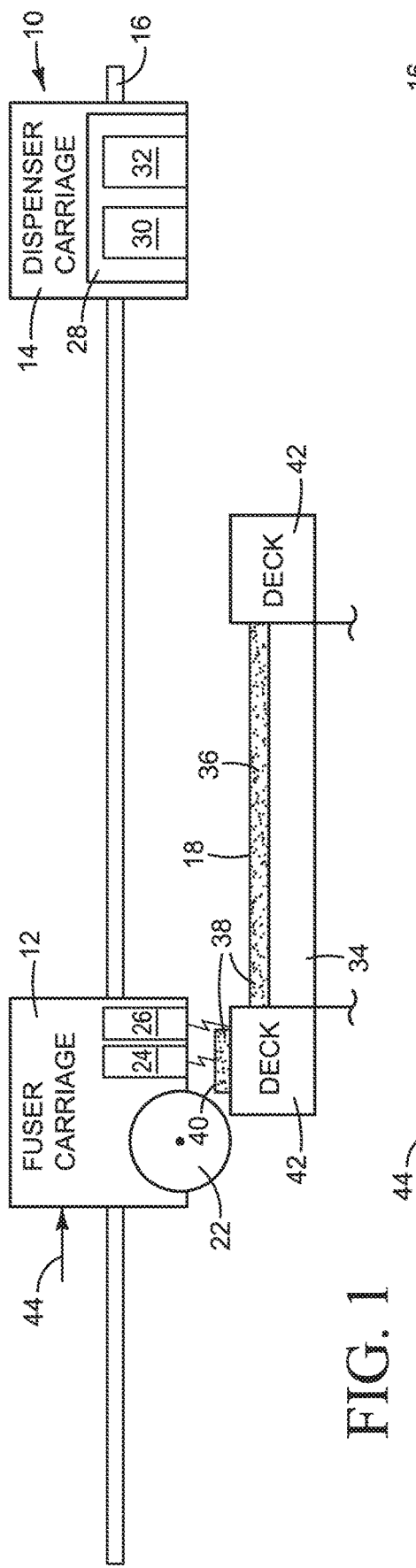

The same part numbers designate the same or similar parts throughout the figures. The figures are not to scale. The scale of the layers of build material and object slices is greatly exaggerated in the figures. Each layer of build material in a fusing process such as that shown in FIGS. 3-28 may be less than 100 μm, with thousands of layers to manufacture an object.

DESCRIPTION

In some additive manufacturing processes, heat is used to fuse together particles in a powdered build material to form a solid object. Heat to fuse the build material may be generated, for example, by applying a liquid fusing agent to a thin layer of powdered build material in a pattern based on the object slice and then exposing the patterned area to fusing light. Light absorbing components in the fusing agent absorb light energy to help heat the patterned build material above the fusing temperature, to sinter, melt or otherwise fuse the build material. Other liquid agents may be used to produce the desired characteristics of an object. For example, a detailing agent may be used to enhance or inhibit fusing in certain regions of an object, coloring agents may be used for different color objects or different colors in a single object, and other agents may be used to affect physical properties such as ductility and conductivity. The process is repeated layer by layer and slice by slice to complete the object.

A new fusing technique has been developed to help improve the ductility of plastic objects. In one example, a four pass fusing process is used to heat the build material above the fusing temperature and keep it there in a molten state long enough for reptation, and then cool the fused build material below the crystallization temperature and leave it there briefly to help lock the polymer into an amorphous state while inhibiting crystallization. In one such four pass fusing process, for example, during a first carriage pass, build material in a layer of unfused build material is preheated and then a liquid fusing agent is selectively dispensed on to preheated unfused build material. During a second carriage pass, build material on which the fusing agent has been dispensed is irradiated with a fusing light to heat the build material above the fusing temperature to form fused build material. Although fusing light is usually applied to the entire work area, irradiating build material treated with fusing agent as well as untreated build material, selective lighting may also be used to target the treated build material. During a third carriage pass, the fused build material is irradiated with the fusing light and, during a fourth carriage pass, the fused build material is irradiated again with the fusing light, to keep the fused build material above the fusing temperature for the desired reptation period. Then, also during the fourth carriage pass, the fused build material is cooled rapidly below the crystallization temperature by spreading the next layer of unfused build material over the hot build material. The sequence then begins again immediately with the first carriage pass. Preheating the new layer of unfused build material in the first carriage pass warms the underlying fused build material above the crystallization temperature to limit the duration of "extreme" cooling and thus inhibit crystallization and edge curl along the perimeter.

For additive manufacturing plastic objects, this and other examples of the new fusing technique enable polymers in the build material to develop and retain an amorphous structure exhibiting higher ductility and lower brittleness compared to other additive manufacturing techniques. However, examples are not limited to additive manufacturing plastic objects. In other examples, other types of build materials may be used to manufacture the objects.

These and other examples described below and shown in the figures illustrate but do not limit the scope of the patent, which is defined in the Claims following this Description.

As used in this document: "and/or" means one or more of the connected things; a "fusing agent" means a substance that causes or helps cause a build material to sinter, melt or otherwise fuse; a "detailing agent" means a substance that inhibits or prevents or enhances fusing a build material, for example by modifying the effect of a fusing agent; "irradiate" means to expose to radiation, including heat and light; "light" means electromagnetic radiation of any wavelength; a "liquid" means a fluid not composed primarily of a gas or gases; a "processor readable medium" means any non-transitory tangible medium that can embody, contain, store, or maintain instructions and other information for use by a processor and may include, for example, circuits, integrated circuits, ASICs (application specific integrated circuits), hard drives, random access memory (RAM), read-only memory (ROM), and flash memory; and "work area" means any suitable structure to support or contain build material for fusing, including underlying layers of build material and in-process slice and other object structures.

Figure 2:
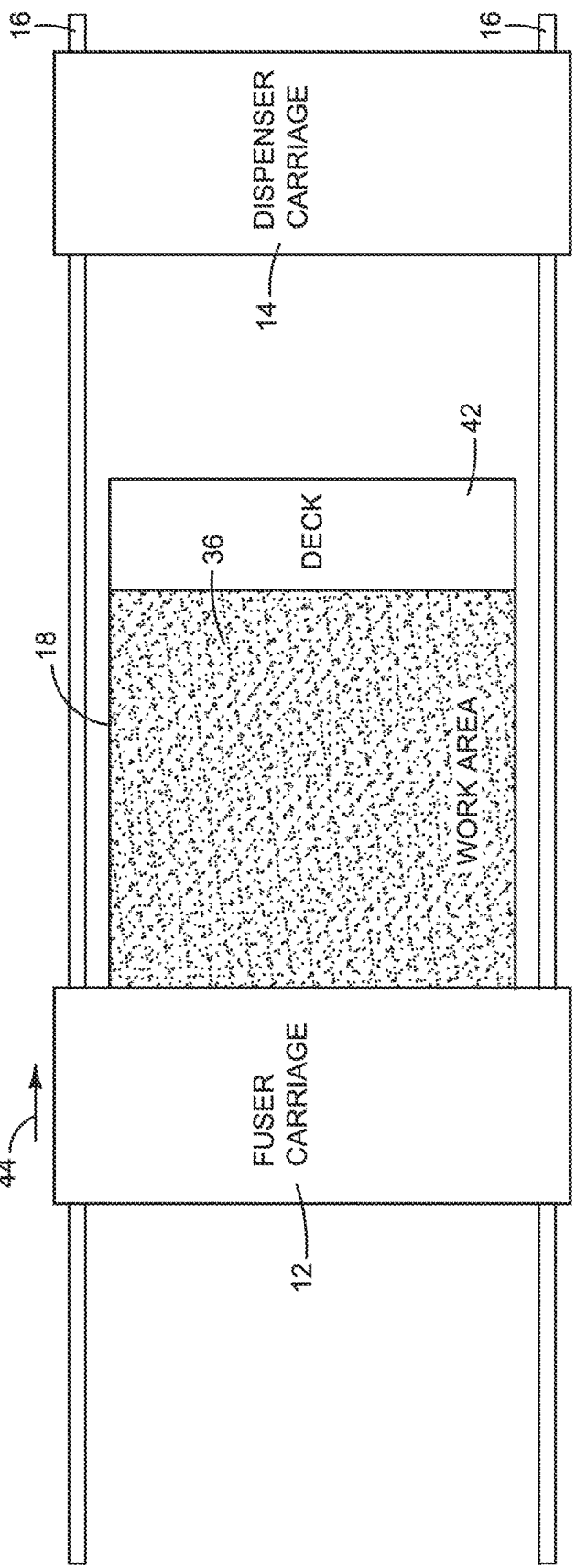

FIGS. 1 and 2 are elevation and plan views, respectively, illustrating one example of a fusing system 10 for an additive manufacturing machine. FIGS. 3-28 present a sequence of views showing one example of a four pass fusing process using system 10. Referring to FIGS. 1 and 2, fusing system 10 includes a first, "fuser" carriage 12 and a second, "dispenser" carriage 14. Carriages 12 and 14 move back and forth on rails 16 over a work area 18. Fuser carriage 12 carries a layering device 22, a warmer 24, and a fusing lamp 26. Dispenser carriage 14 carries an inkjet printhead assembly or other suitable liquid dispensing assembly 28 to dispense a liquid fusing agent. In the example shown, dispensing assembly 28 includes a first dispenser 30 to dispense a fusing agent and a second dispenser 32 to dispense another agent, for example a detailing agent.

In the example shown in FIGS. 1 and 2, layering device 22 is implemented as a roller 22 that moves between a deployed position to layer build material as carriage 12 moves over work area 18 and a retracted position (shown in FIG. 9) to not layer build material as carriage 12 moves over work area 18. Other implementations for a layering device 22 are possible including, for example, a blade or a device that dispenses build material in a layer directly over the work area.

Warmer 24 may be implemented as a "warming" lamp or other radiant heating device 24. "Warming" in this context refers to the preheating function of warmer 24 to heat unfused build material in work area 18 to a temperature nearer the fusing temperature. Although a single device 24 is shown, multiple warming lamps or other radiant heating devices 24 could be used. Also, while a single fusing lamp 26 is depicted, multiple fusing lamps may be used, for example to enable a greater range of fusing light.

Although the characteristics of a warming lamp 24 and a fusing lamp 26 may vary depending on characteristics of the build material and fusing agent (and other fusing process parameters), usually a lower color temperature warming lamp 24 and higher color temperature fusing lamp 26 will be desirable to better match the spectral absorption of untreated and treated build material, respectively, for increased energy transfer from the lamps to the build material. For example, a warming lamp 24 operating in the range of 800K to 2150K may be used to achieve the desired level of power absorption for effectively preheating an untreated white or other light colored build material, and a fusing lamp 26 operating in the range of 2400K to 3500K may be used to achieve the desired level of power absorption for effectively fusing the same build material treated with a black or high absorption low tint liquid fusing agent with no significant heating of the surrounding untreated build material. A black fusing agent absorbing nearly all of the radiant energy emitted by the higher color temperature fusing lamps fuses the treated build material without also fusing the surrounding untreated build material.

Figure 15:
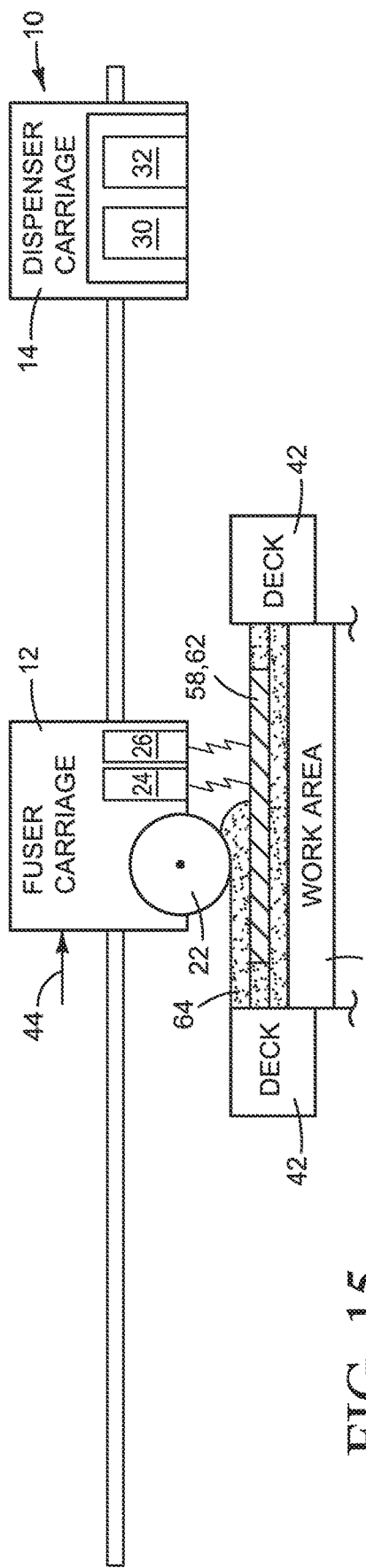

As noted above, work area 18 represents any suitable structure to support or contain build material for fusing, including underlying layers of build material and in-process slice and other object structures. For a first layer of build material, for example, work area 18 may be formed on the surface of a platform 34 that moves up and down to accommodate the layering process. For succeeding layers of build material, work area 18 may be formed on an underlying structure 36. In FIG. 1, underlying structure 36 is a layer of unfused build material 38. In FIG. 15, underlying structure 36 is an object structure that includes unfused build material and build material that has been fused into an object slice.

Figure 3:
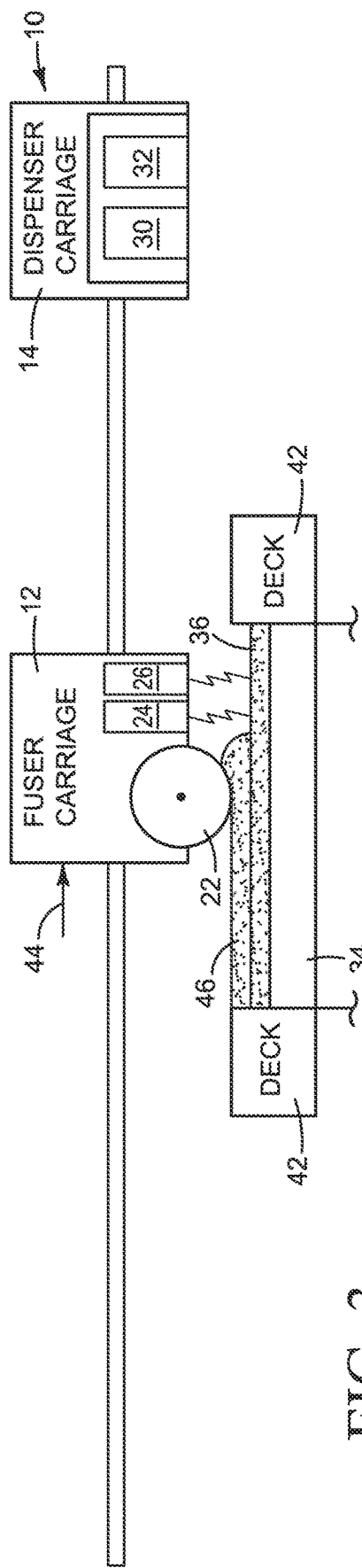
Figure 4:
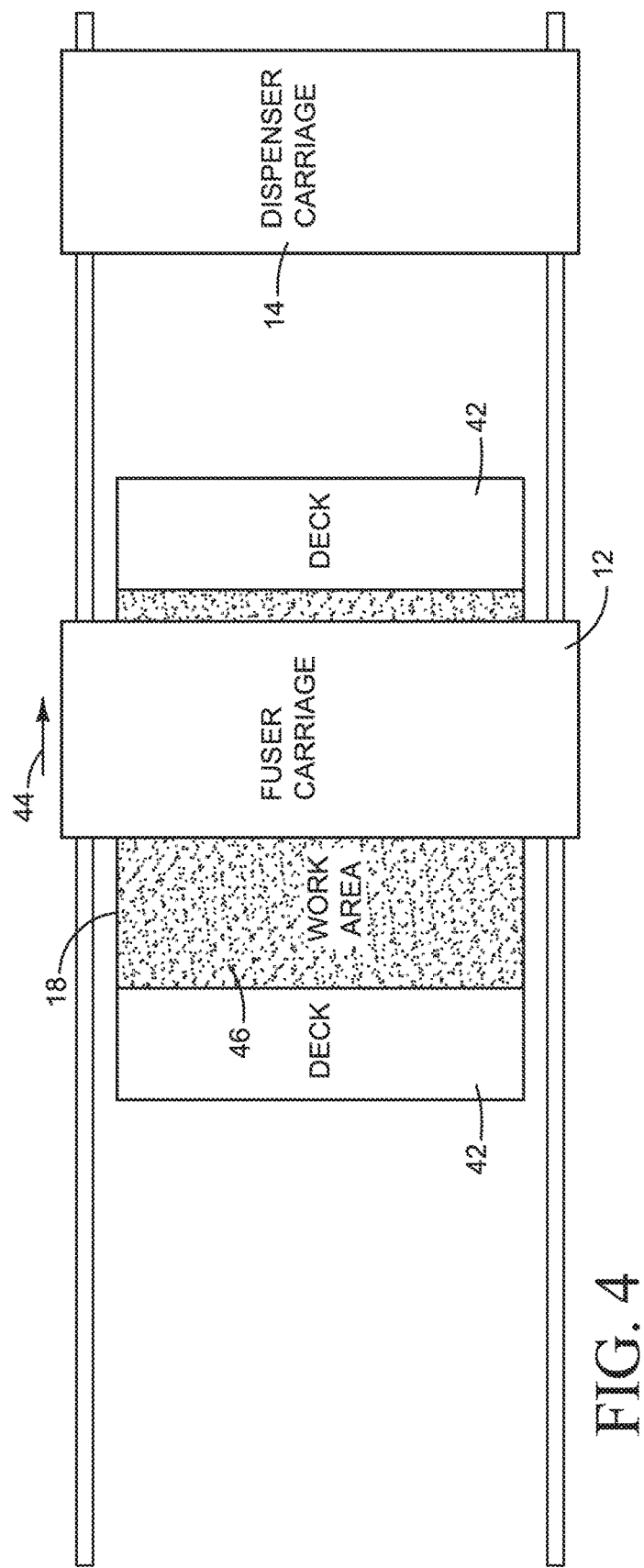

In FIGS. 1 and 2, a ribbon 40 of unfused build material 38 has been deposited along a deck 42 adjacent to work area 18, layering roller 22 is deployed, warming lamp 24 and fusing lamp 26 are on, and fuser carriage 12 is moving to the right in a first pass, as indicated by motion arrows 44. In FIGS. 3 and 4, as fuser carriage 12 continues moving to the right, warming lamp 24 heats underlayer 36 while roller 22 layers unfused build material in a layer 46 over underlayer 36. Fusing lamp 26 may contribute a small amount of heat to unfused build material in underlayer 36. However, as noted above, in this example the fusing lamp is configured to optimize heating build material that has been treated with a fusing agent, and thus heat untreated build material poorly.

Figure 5:
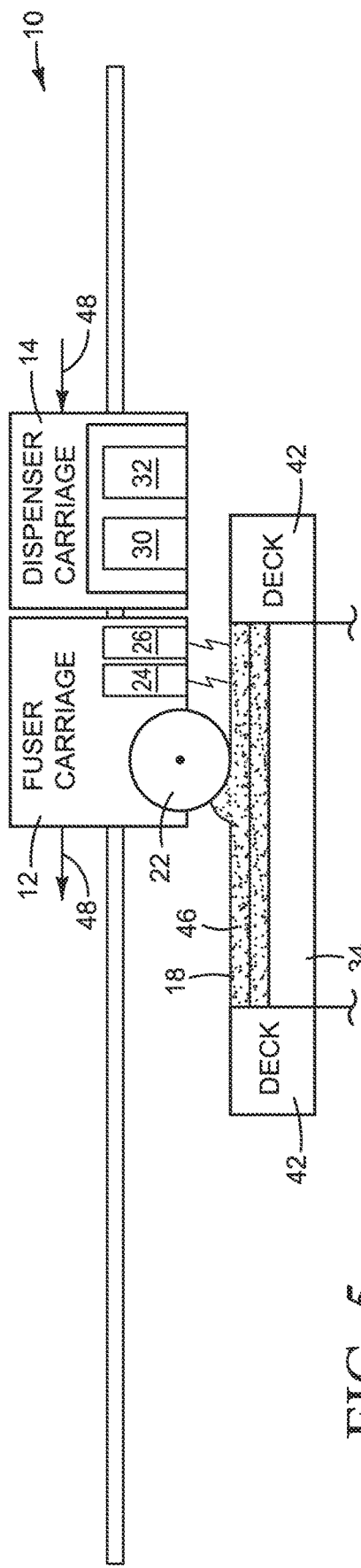
Figure 6:
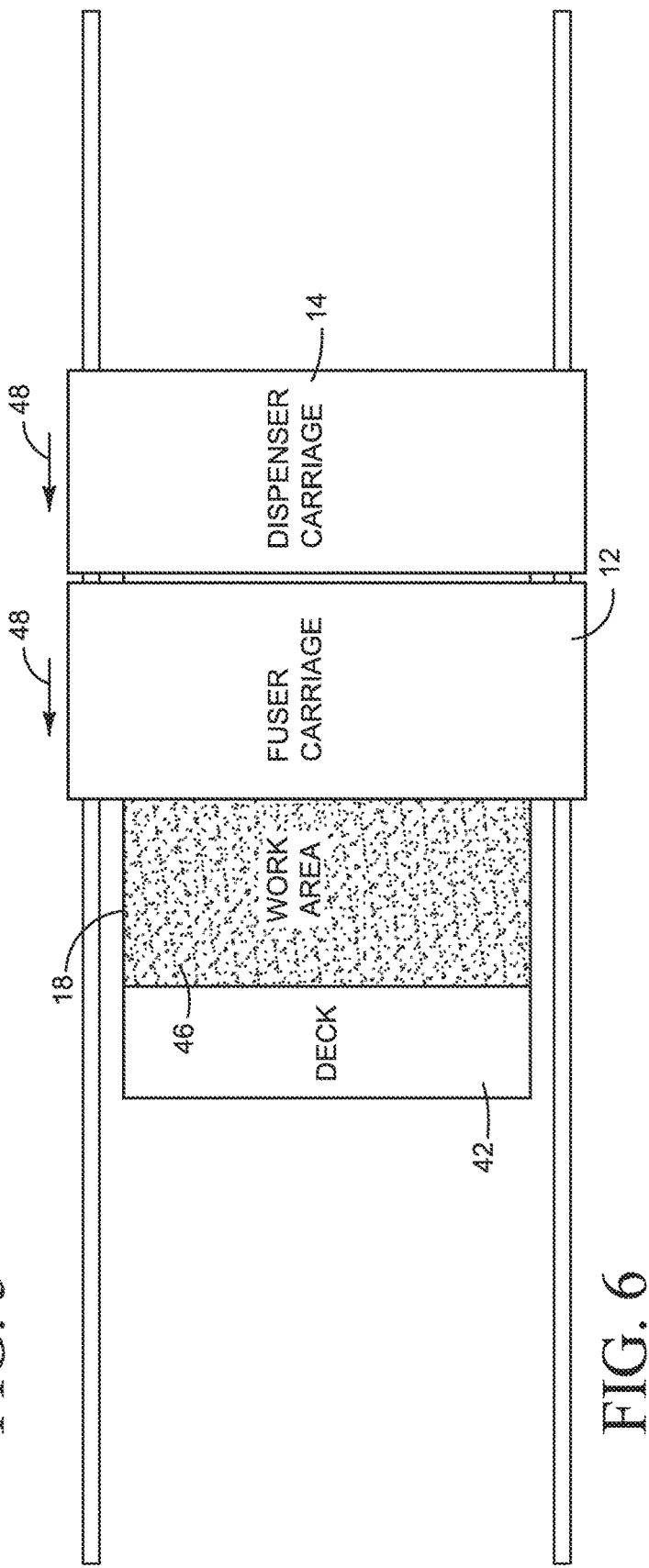

In FIGS. 5 and 6, fuser carriage 12 is moving to the left in a first pass of the fusing sequence, indicated by motion arrows 48. Layering roller 22 is deployed to re-layer any excess build material in layer 46 and warming lamp 24 is on to preheat build material in layer 46. An excess of build material may be desirable, for example, to help ensure complete coverage of the underlying structure, including cavities that may have formed during fusing. Roller 22 previously moving to the right in FIGS. 3 and 4 may be retracted to jump over any excess build material that accumulates on left deck 42 in preparation for re-layering the excess build material in the first pass of the fusing cycle shown in FIGS. 5 and 6.

In FIGS. 7 and 8, dispenser carriage 14 follows fuser carriage 12 over work area 18 in the first pass, and dispenser 30 dispenses a fusing agent 52 on to build material 38 in layer 46 in a pattern 54 based on the desired object slice. In this example, dispenser 32 also dispenses a detailing or other agent 56 on to patterned build material 54 and/or unpatterned build material in layer 46 in the first pass.

In FIGS. 9 and 10, as dispenser carriage 14 moves to the right in a second pass, indicated by motion arrows 44, dispensers 30 and 32 dispense agents 52 and 56, respectively, on to patterned and/or unpatterned build material in layer 46. In FIGS. 11 and 12, fuser carriage 12 follows dispenser carriage 14 over work area 18 in the second pass, and fusing lamp 26 is on to irradiate patterned build material 54 with fusing light to fuse patterned build material. Fused build material 58 forms a first object slice 60. In this example, warming lamp 24 is on in the second pass, for example to slow the cooling of fused material 58.

Figure 13:
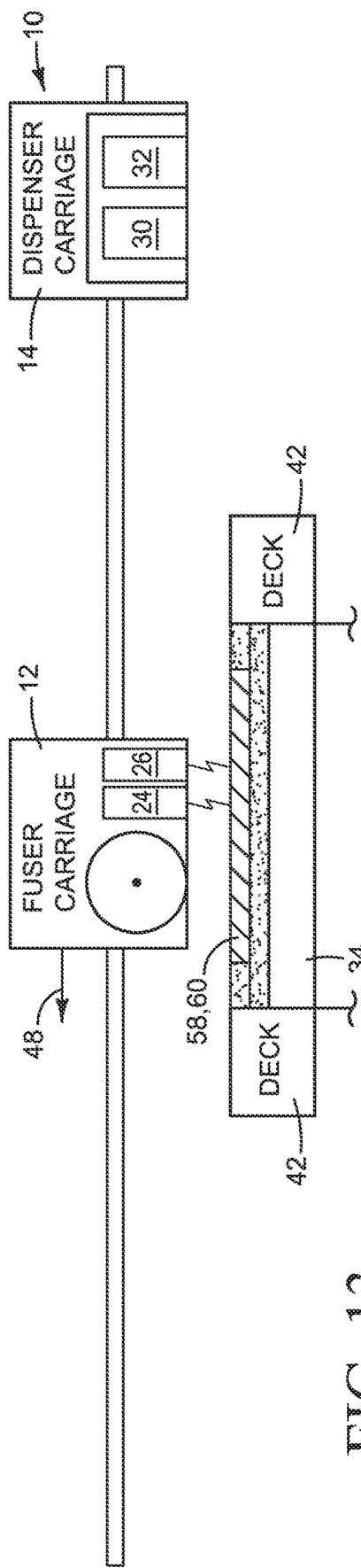
Figure 14:
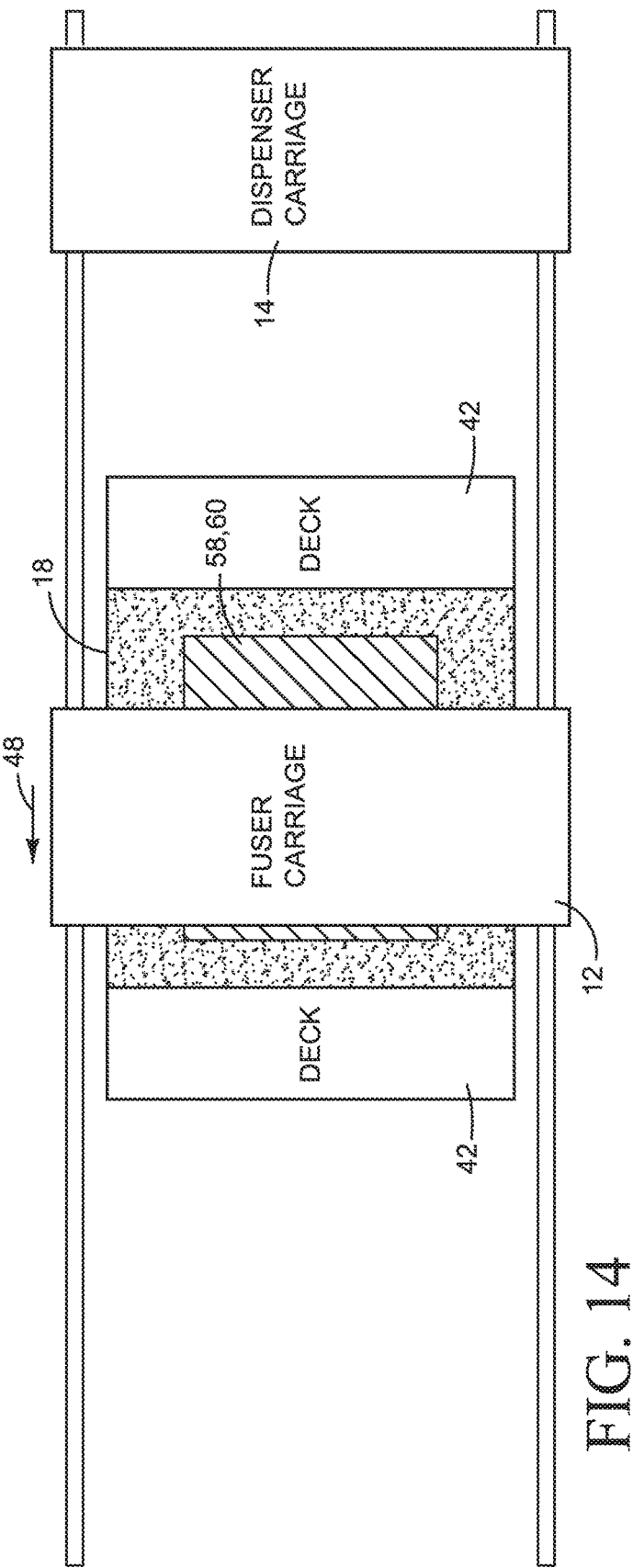
Figure 16:
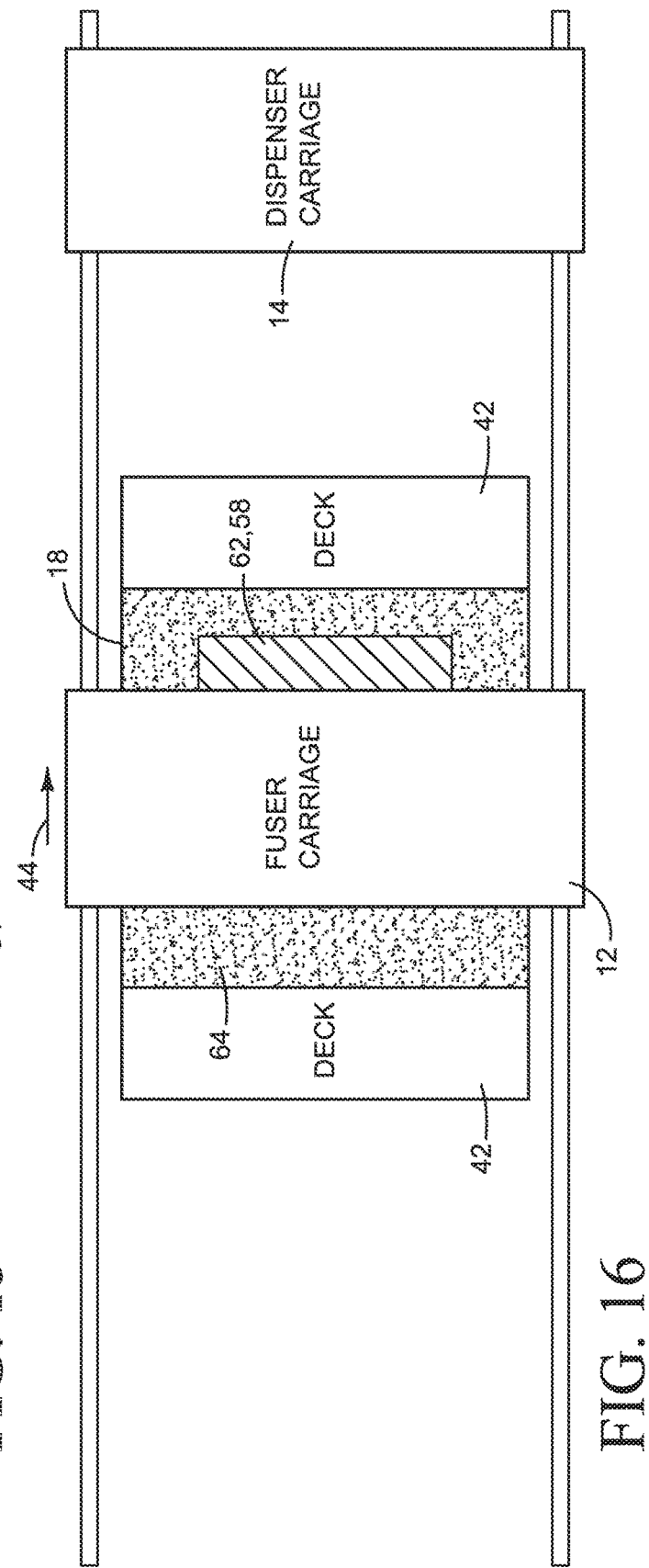

In FIGS. 13 and 14, dispenser carriage 14 remains parked while fuser carriage 12 moves to the left in a third pass, indicated by motion arrows 48, with warming lamp 24 and fusing lamp 26 on to irradiate fused build material 58. The nearly continuous exposure to both the heat from warmer 24 and the light from lamp 26 helps keep fused build material 58 at or above the fusing temperature. In FIGS. 15 and 16, fuser carriage 12 is moving to the right in a fourth pass with warming lamp 24 and fusing lamp 26 on to irradiate fused build material 58. The lamps are followed immediately by roller 22 spreading unfused build material 38 in the next layer 64 over the underlying structure 62 to cool fused build material 58.

Figure 17:
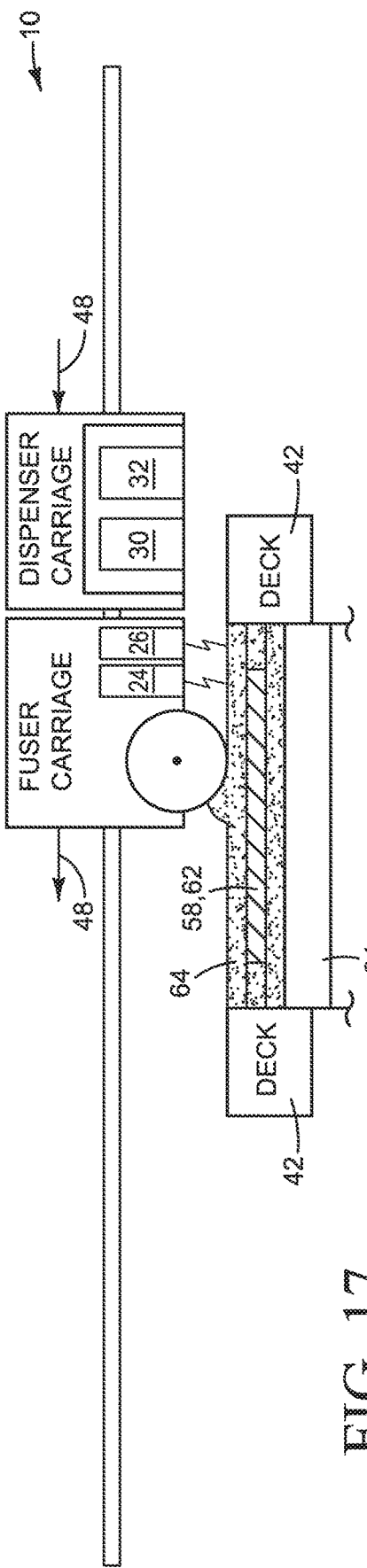
Figure 18:
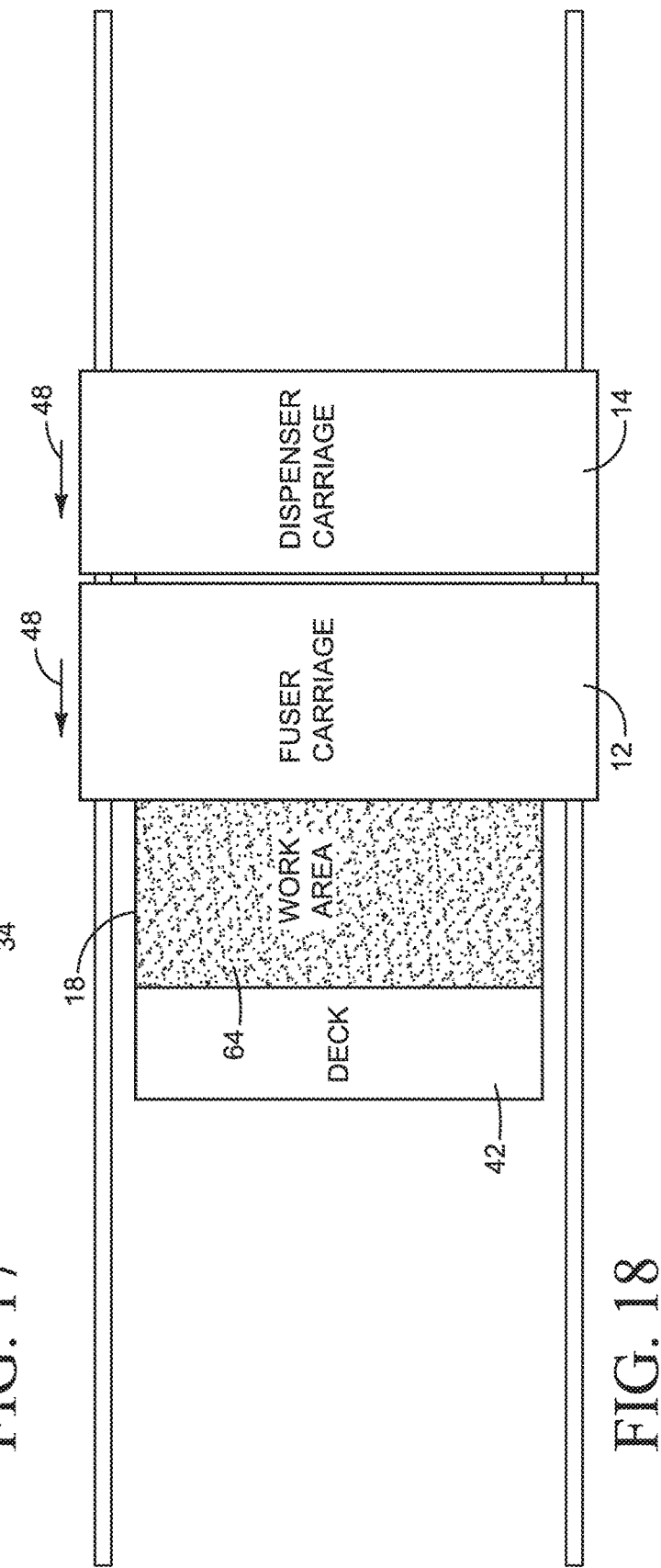
Figure 19:
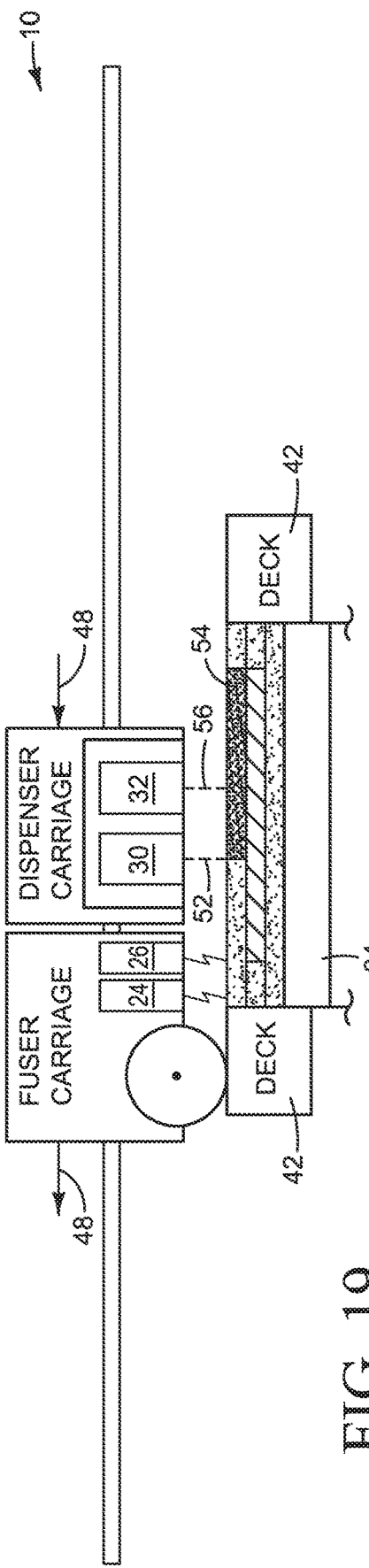
Figure 20:
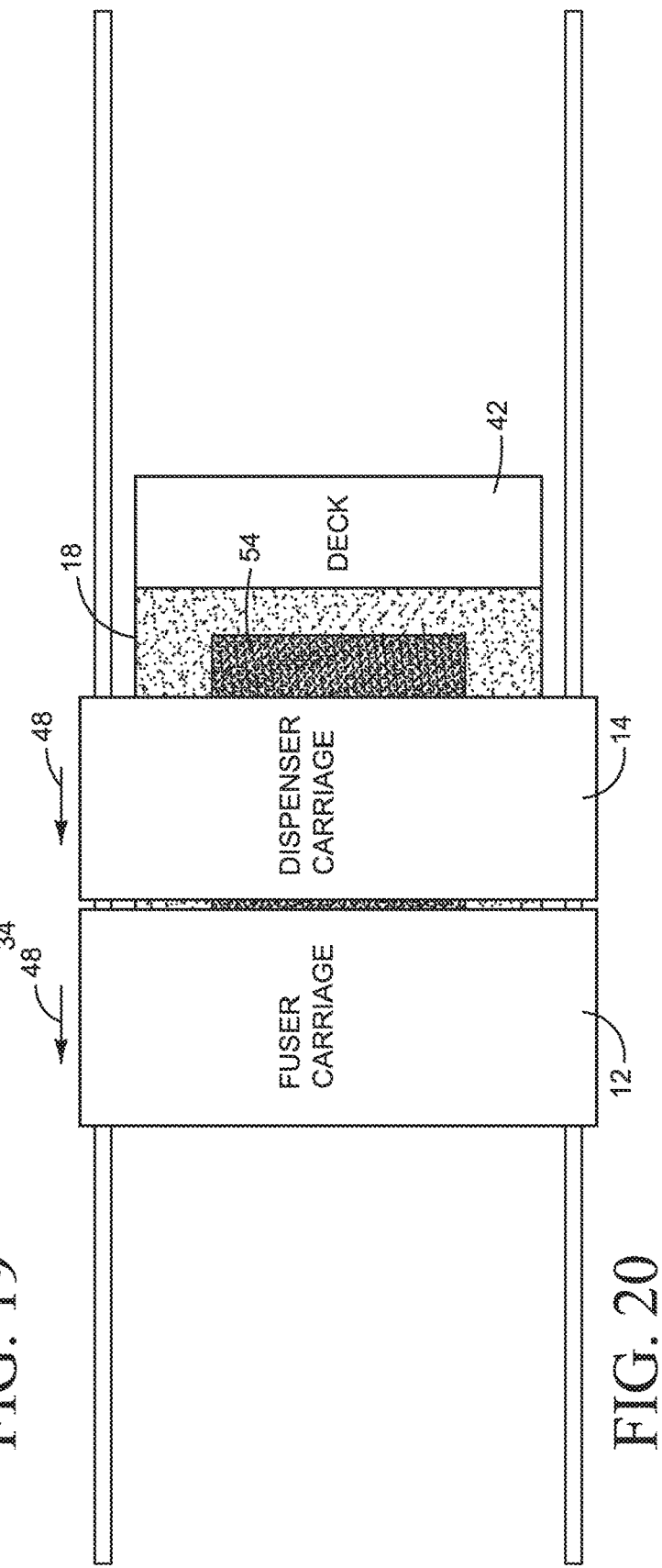

The sequence then begins again with the first carriage pass to preheat layer 64 and warm the underlying fused build material 58, as shown in FIGS. 17 and 18. The four pass fusing cycle for next layer 64 is shown in FIGS. 17-28, to form a second slice 68 covered by the next succeeding layer 70. The fusing process continues layer by layer and slice by slice to complete the object. The sequence of four carriage passes represents a continuing cycle during manufacturing and, thus, the numbering of the passes first, second, third and fourth in the example described above does not necessarily imply a beginning and an end. For example, the beginning of the sequence for one layer may be the end of the sequence for another layer. The passes could be numbered differently from that described.

Other processing and system configurations are possible. For example, layering roller 22 could be retracted throughout the second pass (FIGS. 5 and 6), such as when re-layering build material is not desired. More or fewer agent dispensers are possible to dispense more or fewer agents, and more or fewer carriages could be used to carry the movable components. Also, the sequence of dispensing agents may vary from that shown and, although one carriage follows immediately after the other carriage in some passes, the carriages could be staggered as part of the same pass. In some system configurations, a stationary warmer and/or fusing lamp may be used to continuously irradiate the work area with fusing light (except when blocked by a carriage), rather than intermittently as with carriage mounted components.

Figure 28:
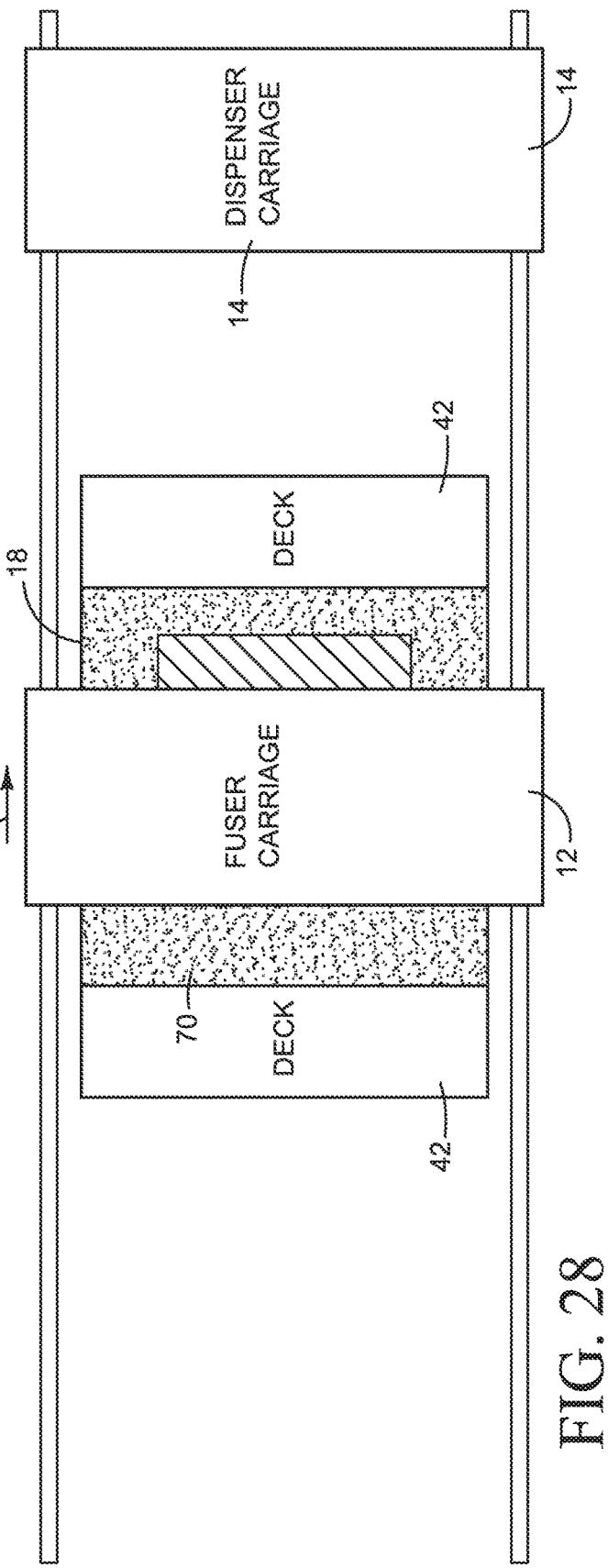
Figure 29:
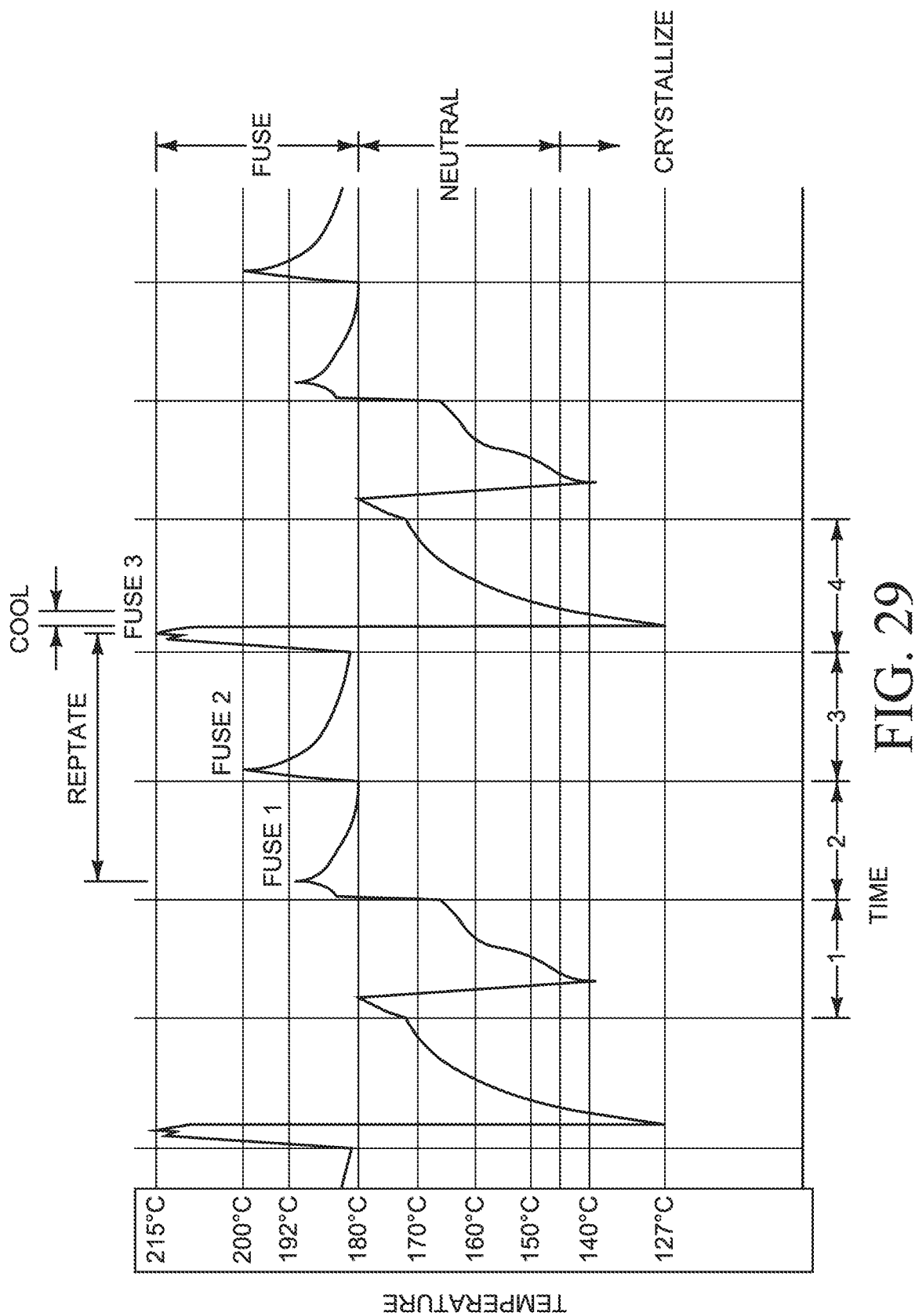
FIG. 29 is a graph illustrating one example of a four pass fusing cycle.

FIG. 29 is a graph illustrating one example of a four pass fusing cycle such as that described above with reference to FIGS. 3-28. The temperatures in FIG. 29 represent processing temperatures for a polyamide build material powder, such as PA-12 powder. Referring to FIG. 29, during a first carriage pass (indicated by "1" along the time line), for example as shown in FIGS. 17-20, unfused build material in the next layer is preheated, as indicated by a steeply rising temperature curve in pass 1, and then a liquid agent is dispensed on to preheated unfused build material in the layer, as indicated by the sharply declining temperature curve in pass 1. Heat from the underlying slice warms build material in the next layer, as indicated by the gradually rising temperature curve in pass 1.

During a second carriage pass (indicated by "2" along the time line), for example as shown in FIGS. 21-24, more agent is dispensed on to build material in the layer and then build material on which at least a fusing agent has been dispensed is irradiated with a fusing light to heat build material above the fusing temperature, as indicated by the temperature curve rising steeply to "Fuse 1." The now fused build material may cool slightly before the next carriage pass, as indicated by the gradually declining temperature curve after Fuse 1 in pass 2.

Figure 25:
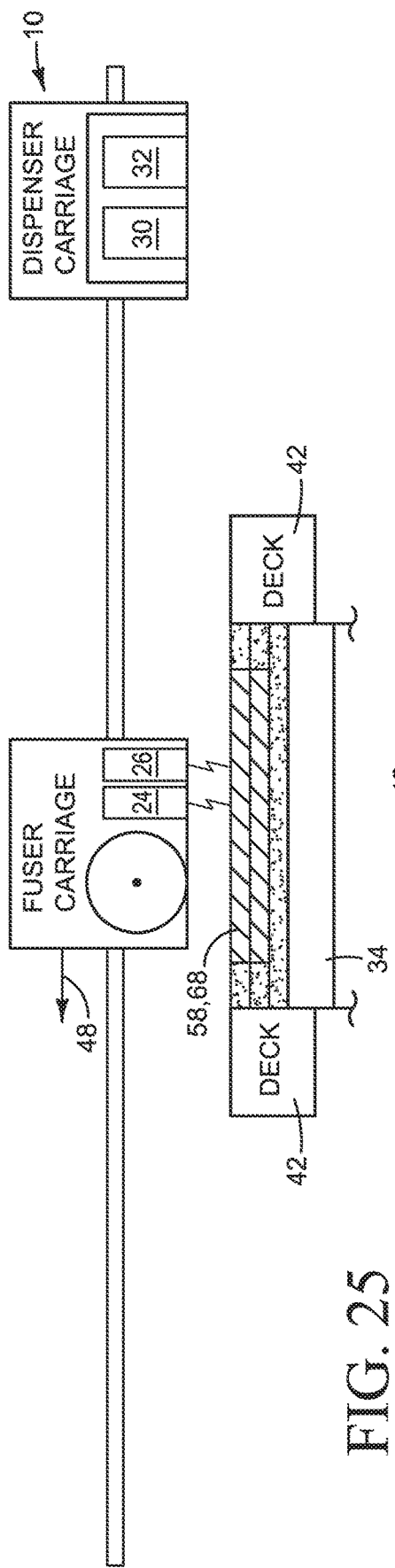
Figure 26:
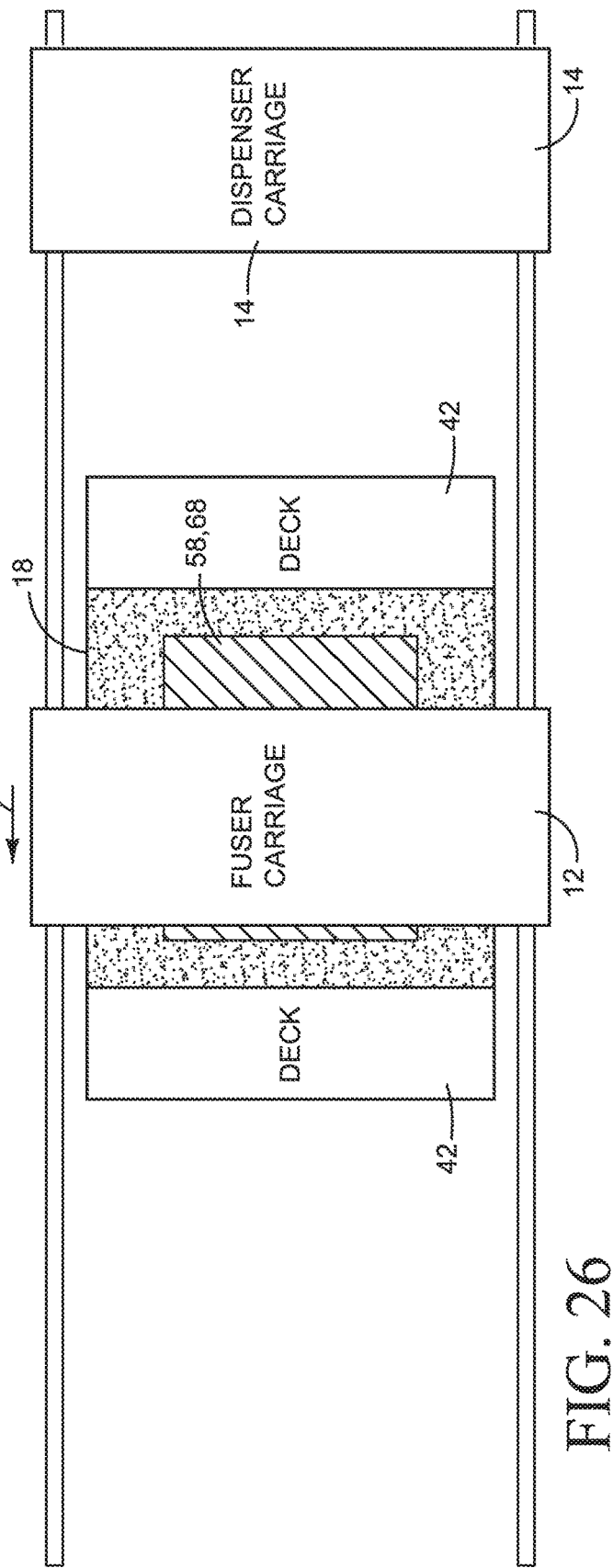

During a third carriage pass (indicated by "3" along the time line), for example as shown in FIGS. 25 and 26, the fused build material is irradiated with fusing light to keep the fused build material above the fusing temperature, as indicated by the temperature curve rising steeply to "Fuse 2." The fused build may cool before the next carriage pass, as indicated by the gradually declining temperature curve after Fuse 2 in pass 3.

Figure 27:
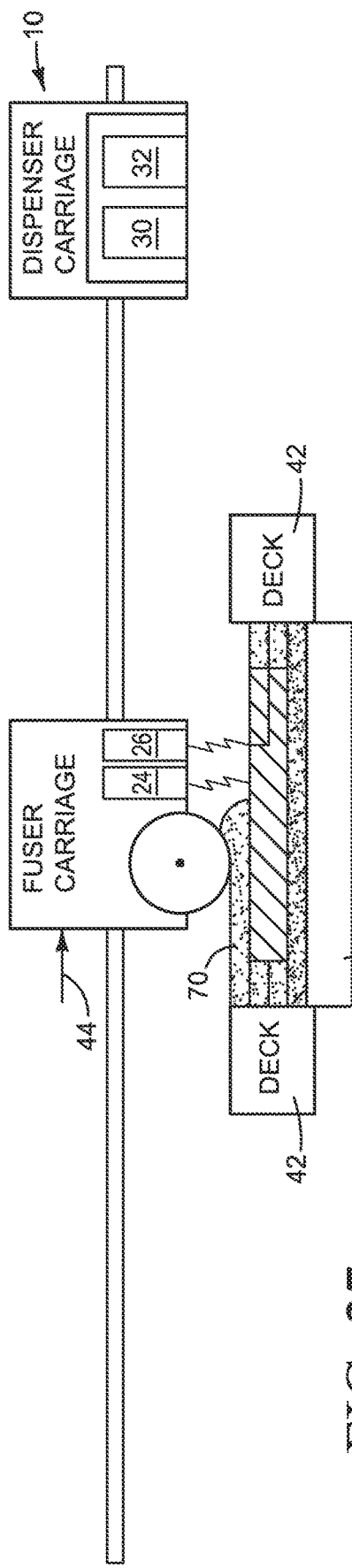

During a fourth carriage pass (indicated by "4" along the time line), for example as shown in FIGS. 27 and 28, the fused build material is irradiated again with fusing light to keep the fused build material above the fusing temperature, as indicated by the temperature curve rising steeply to "Fuse 3", and then cooled rapidly by spreading the next layer of unfused build material over the fused build material, as indicated by the steeply declining temperature curve after Fuse 3 in pass 4. Heat from the new underlying slice warms the next layer of build material, as indicated by the gradually rising temperature curve in pass 4, in advance of pass 1 for the next fusing cycle.

Still referring to FIG. 29, unfused build material is preheated to a neutral zone in passes 1 and 2 above the crystallization temperature and below the fusing temperature, about 145° C. and 180° C., respectively, in this example. Beginning at about Fuse 1 during the second pass, the temperature of the fused build material is raised into a fuse zone above the fusing temperature and below a ceiling temperature, about 215° C. in this example. A polyamide build material such as PA-12 represented in FIG. 29 does not fuse at a single temperature. Rather, the polymer enters a molten state as the particles begin to fuse at a "fusing" temperature defining a lower end of the fuse zone and then fusion continues as the temperature increases in the fuse zone. For example, a PA-12 powder may enter a molten state at about 180° C. and melt fully at about 187° C. The fused material may be kept in a molten state, in the fuse region, for 1.0-3.0 seconds to allow adequate time for the desired reptation and then cooled to the crystallize zone for less than 0.75 seconds to help lock the polymer into an amorphous state while inhibiting crystallization. The cooled fused build material is then warmed into the neutral zone to stabilize for 2-3 seconds, for example as the new layer of unfused build material is preheated for the next fusing cycle.

Figure 30:
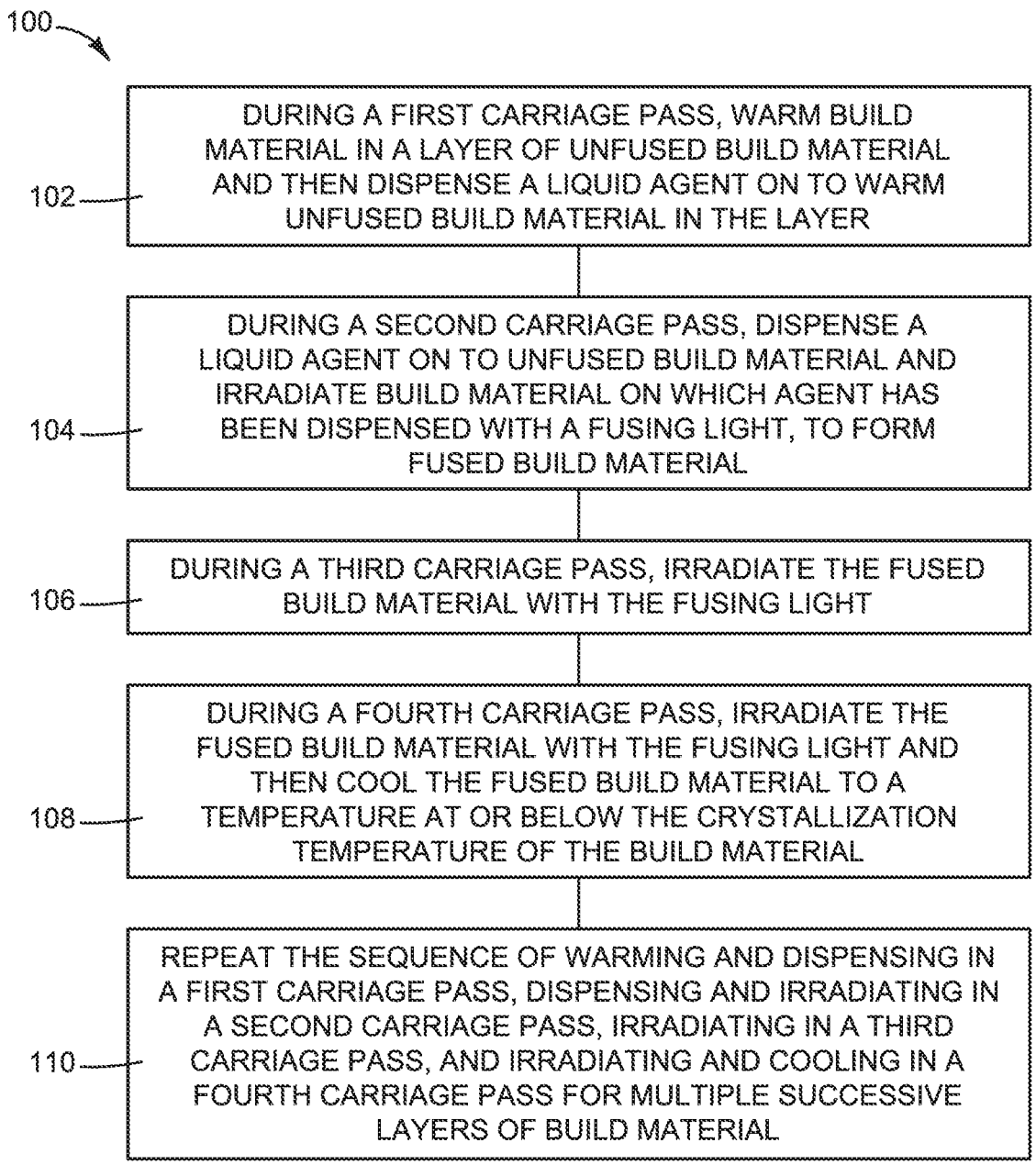
FIGS. 30 and 31 are flow diagrams illustrating examples of a fusing process for additive manufacturing, such as might be implemented with the fusing system of FIGS. 1 and 2.

FIG. 30 illustrates one example of a fusing process 100 for additive manufacturing, such as might be implemented with a fusing system 10 shown in FIGS. 1 and 2. Referring to FIG. 30, during a first carriage pass, build material in a layer of unfused build material is warmed to the desired preheat temperature and then a liquid fusing agent is dispensed on to warm unfused build material in the layer (block 102), for example as shown in FIGS. 5-8. During a second carriage pass, a liquid fusing or other agent is dispensed on to unfused build material in the layer and then build material in the layer on which the fusing agent has been dispensed is irradiated with a fusing light, to form fused build material (block 104), for example as shown in FIGS. 9-12.

During a third carriage pass, the fused build material is irradiated with the fusing light (block 106), for example as shown in FIGS. 13 and 14. During a fourth carriage pass, the fused build material is irradiated again with the fusing light and then the fused build material is cooled briefly to a temperature at or below a crystallization temperature of the build material (block 108), for example as shown in FIGS. 15 and 16. The sequence of warming and dispensing in a first carriage pass, dispensing and irradiating in a second carriage pass, irradiating in a third carriage pass, and irradiating and cooling in a fourth carriage pass is repeated for multiple successive layers of build material.

Figure 31:
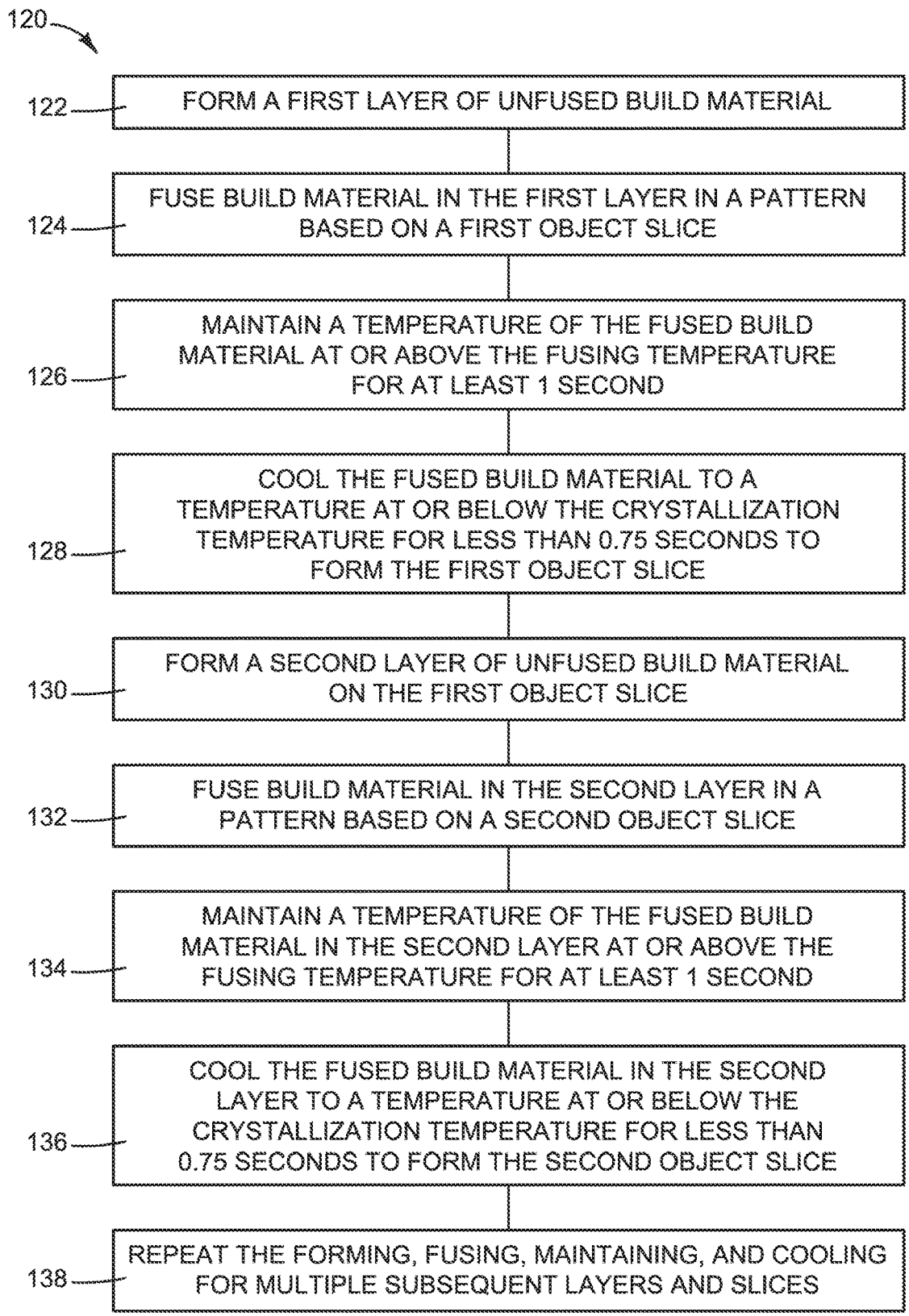

FIG. 31 illustrates another example of a fusing process 120 for additive manufacturing, such as might be implemented with a fusing system 10 shown in FIGS. 1 and 2. Referring to FIG. 31, process 120 includes: forming a first layer of unfused build material (block 122), for example as shown in FIGS. 3 and 4; fusing build material in the first layer in a pattern based on a first object slice (block 124), for example as shown in FIGS. 11 and 12; maintaining a temperature of the fused build material in a molten state at or above a fusing temperature of the build material for at least 1 second (block 126), for example as shown FIGS. 13-16 and FIG. 29; and then cooling the fused build material to a temperature at or below the crystallization temperature of the build material for less than 0.75 seconds to form the first object slice (block 128), for example as shown in FIGS. 15-16 and FIG. 29.

Fusing process 120 in FIG. 31 also includes: forming a second layer of unfused build material on the first object slice (block 130), for example as shown in FIGS. 15 and 16; fusing build material in the second layer in a pattern based on a second object slice (block 132), for example as shown in FIGS. 23 and 24; maintaining a temperature of the fused build material in the second layer in a molten state at or above a fusing temperature of the build material for at least 1 second (block 134), for example as shown in FIGS. 25-28 and FIG. 29; and then cooling the fused build material in the second layer to a temperature at or below the crystallization temperature of the build material for less than 0.75 seconds to form the second object slice (block 136), for example as shown in FIGS. 27-28 and FIG. 29. The forming, fusing, maintaining, and cooling is repeated for multiple subsequent layers and slices (block 138).

Figure 32:
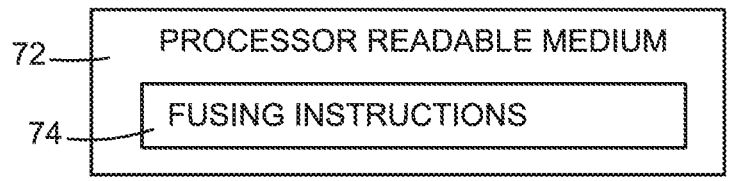
FIG. 32 is a block diagram illustrating one example of a processor readable medium with fusing instructions to fuse build material during additive manufacturing of a 3D object.

FIG. 32 is a block diagram illustrating a processor readable medium 72 with fusing instructions 74 to fuse build material and form an object slice during additive manufacturing of a 3D object. Fusing instructions 74 may include, for example, instructions to perform a process 100 shown in FIG. 30. Fusing instructions 74 may include, for another example, instructions to perform a process 120 shown in FIG. 31.

Processor readable medium 72 with fusing instructions 74 may be implemented, for example, in a CAD computer program product, in an object model processor, and/or in a controller for the fusing system in an additive manufacturing machine (which may be part of the controller for the additive manufacturing machine). Control data to fuse build material using a four pass sequence such as that shown in FIGS. 3-28 may be generated, for example, by processor readable instructions on the source application, usually a CAD computer program product, in an object model processor, and/or by processor readable instructions on the controller for the fusing system in the additive manufacturing machine.

Figure 33:
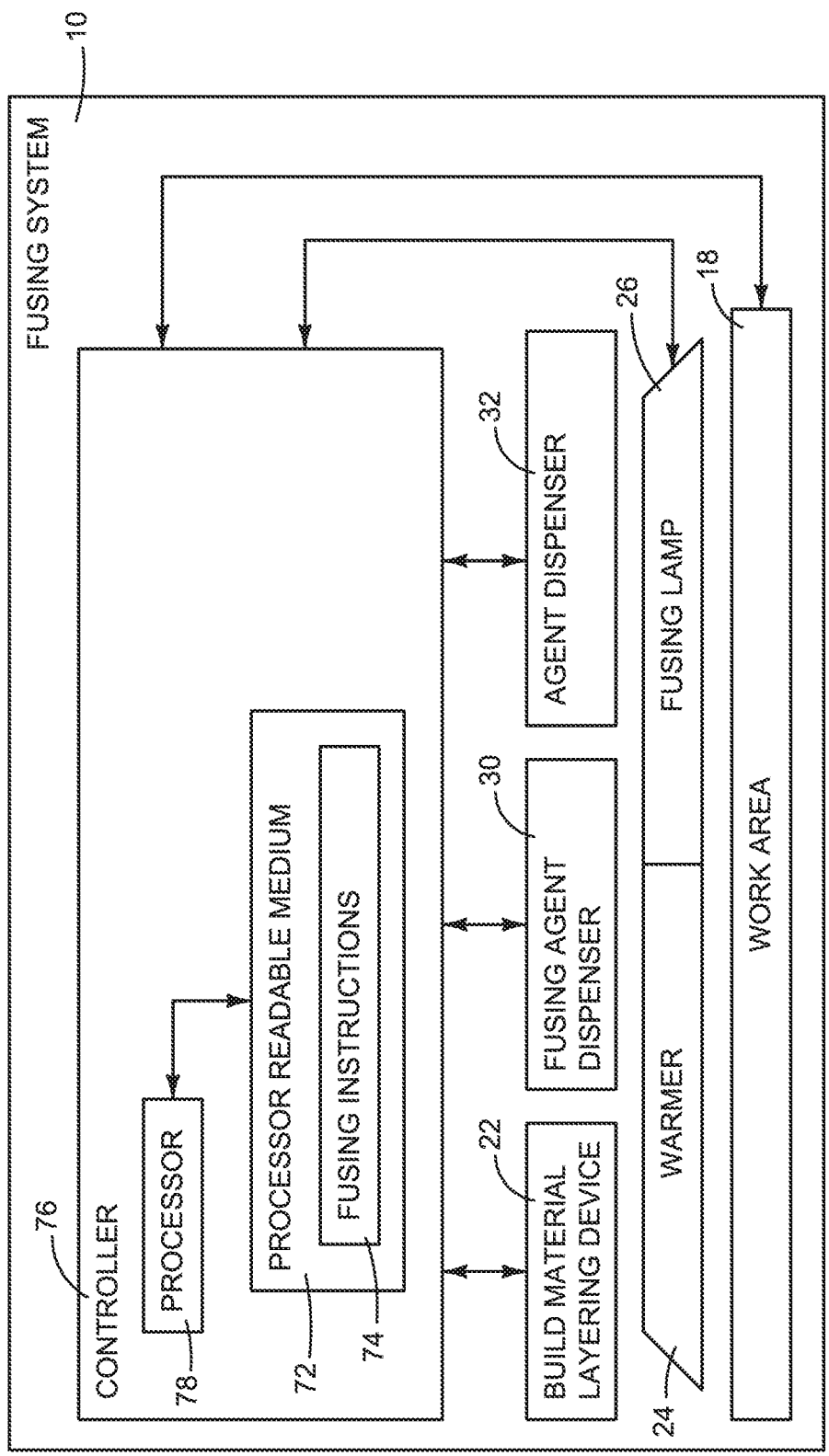
FIG. 33 is a block diagram illustrating one example of a fusing system for an additive manufacturing machine implementing a controller with fusing instructions to fuse build material during additive manufacturing of a 3D object.

FIG. 33 is a block diagram illustrating one example of a fusing system 10 for an additive manufacturing machine, implementing a controller 76 with fusing instructions 74. Referring to FIG. 33, fusing system 10 includes controller 76, a work area 18, a build material layering device 22, a fusing agent dispenser 30, another agent dispenser 32, a warmer 24 and a fusing lamp 26. Layering device 22 layers build material over work area 18 and may include, for example, a device to dispense the build material and a blade or roller to spread the build material for each layer. Fusing agent dispenser 30 and another agent dispenser 32 dispense their respective agents selectively at the direction of controller 76, for example as described above with reference to FIGS. 7-10. While any suitable dispensers 30, 32 may be used, inkjet printheads are sometimes used in additive manufacturing machines because of the precision with which they can dispense agents and their flexibility to dispense different types and formulations of agents.

Controller 76 represents the processing and memory resources, instructions, and the electronic circuitry and components needed to control the operative elements of system 10. In particular, in this example, controller 76 includes a processor readable medium 72 with fusing instructions 74 and a processor 78 to read and execute instructions 74.

The examples shown in the figures and described above illustrate but do not limit the patent, which is defined in the following Claims.

"A", "an" and "the" used in the claims means at least one. For example, "a fusing lamp" means one or more fusing lamps and subsequent reference to "the fusing lamp" means the one or more fusing lamps.

The invention claimed is:

1. A fusing process for additive manufacturing, comprising:
   forming a first layer of unfused build material;
   fusing build material in the first layer in a pattern based on a first object slice;
   maintaining the fused build material in a molten state for at least 1 second; and then
   cooling the fused build material to a temperature at or below the crystallization temperature of the build material for less than 0.75 seconds to form the first object slice;
   forming a second layer of unfused build material on the first object slice;
   fusing build material in the second layer in a pattern based on a second object slice;
   maintaining the fused build material in the second layer in a molten state for at least 1 second; and then
   cooling the fused build material in the second layer to a temperature at or below the crystallization temperature of the build material for less than 0.75 seconds to form the second object slice; and
   repeating the forming, fusing, maintaining, and cooling for multiple subsequent layers and slices.

2. The process of claim 1, where:
   the fusing comprises dispensing a liquid fusing agent on to build material in a pattern based on an object slice and then irradiating patterned build material from above;
   the maintaining comprises irradiating patterned build material from above multiple times after fusing; and
   the cooling comprises forming a subsequent layer of unfused build material on the slice formed in the preceding layer.

3. The process of claim 2, where the build material is a polyamide powder, the fusing temperature is at least 180° C. and the crystallization temperature is 145° C. or less.

4. The process of claim 3, comprising:
   before fusing build material in the first layer, preheating unfused build material in the first layer to 145° C. -180° C.; and
   before fusing build material in the second layer, preheating unfused build material in the second layer to 145° C. -180° C.

5. A processor readable medium having instructions thereon that when executed cause a fusing system for an additive manufacturing machine to:
   during a first carriage pass, preheat build material in a layer of unfused build material;
   during the first carriage pass and/or during a second carriage pass, dispense a liquid fusing agent on to preheated unfused build material in the layer and then, during the second carriage pass, irradiate build material in the layer on which the fusing agent has been dispensed with a fusing light to form a fused build material; and
   during a third carriage pass, irradiate the fused build material with the fusing light; and
   during a fourth carriage pass, irradiate the fused build material with the fusing light and then actively cool the fused build material.

6. The medium of claim 5, where the instructions include instructions to repeat the sequence of preheating during a first carriage pass, dispensing during the first carriage pass and/or a second carriage pass, irradiating in the second carriage pass, irradiating in a third carriage pass, and irradiating and cooling in a fourth carriage pass for multiple successive layers of build material.

7. The medium of claim 5, where the instructions to actively cool the fused build material during the fourth carriage pass includes instructions to layer unfused build material over the fused build material.

8. The medium of claim 5, where the instructions to, during a fourth carriage pass, actively cool the fused build material includes instructions to actively cool the fused build material during the fourth carriage pass at least 1-3 seconds after build material is irradiated with the fusing light in the second carriage pass.

9. The medium of claim 5, where the instructions to cool the fused build material during the fourth carriage pass includes instructions to cool the fused build material in the second layer to a temperature at or below a crystallization temperature of the build material for less than 0.75 seconds.

10. A fusing system for an additive manufacturing machine, comprising:
a first carriage movable over a work area carrying a fusing lamp;
a second carriage movable over the work area carrying an agent dispenser;
a controller operatively connected to the first carriage, the fusing lamp, the second carriage and the agent dispenser to:
with the first carriage moving over the work area, irradiate fused build material in a first layer of build material with the fusing lamp and form a second layer of unfused build material on the first layer;
with the second carriage moving over the work area, dispense a liquid fusing agent on to build material in the second layer with the dispenser in a pattern;
with the first carriage moving over the work area, irradiate the patterned build material in the second layer with the fusing lamp; and then with the first carriage moving over the work area, irradiate the patterned build material in the second layer again with the fusing lamp.

11. The system of claim 10, where:
the first carriage carries a warmer; and
the controller is operatively connected to the warmer to, with the first carriage moving over the work area, heat unfused build material in the second layer with the warmer.

12. The system of claim 11, where the warmer comprises a lamp with an operating color temperature in the range of 800K to 2150K and the fusing lamp comprises a fusing lamp with an operating color temperature in the range of 2400K to 3500K.

13. The system of claim 12, where:
the first carriage carries a layering device; and
the controller is operatively connected to the layering device to, with the first carriage moving over the work area, form the second layer of unfused build material on the first layer with the layering device.

14. The system of claim 13, where the controller is operatively connected to the first carriage, the fusing lamp and the layering device to irradiate fused build material in a first layer of build material with the fusing lamp and form a second layer of unfused build material on the first layer with the layering device in a single pass of the first carriage moving over the work area.

15. The system of claim 13, where the a controller is operatively connected to the first carriage, the fusing lamp, the second carriage and the agent dispenser to:
dispense a liquid fusing agent on to build material in the second layer with the dispenser in a pattern in a single pass of the second carriage moving over the work area;
irradiate the patterned build material in the second layer with the fusing lamp in a single pass of the first carriage over the work area; and then
irradiate the patterned build material in the second layer again with the fusing lamp in a single pass of the first carriage over the work area.

* * * * *